(12) United States Patent
Bansal et al.

(10) Patent No.: US 10,588,009 B2
(45) Date of Patent: Mar. 10, 2020

(54) PSM MESSAGE-BASED DEVICE DISCOVERY FOR A VEHICULAR MESH NETWORK

(71) Applicant: TOYOTA JIDOSHA KABUSHIKI KAISHA, Toyota-shi, Aichi-ken (JP)

(72) Inventors: Gaurav Bansal, Mountain View, CA (US); Hongsheng Lu, Mountain View, CA (US); John Kenney, Mountain View, CA (US)

( * ) Notice: Subject to any disclaimer, the term of this patent is extended or adjusted under 35 U.S.C. 154(b) by 111 days.

(21) Appl. No.: 15/796,296

(22) Filed: Oct. 27, 2017

(65) Prior Publication Data

US 2019/0132722 A1 May 2, 2019

(51) Int. Cl.
| | |
|---|---|
| H04W 8/00 | (2009.01) |
| G08G 1/005 | (2006.01) |
| H04L 29/08 | (2006.01) |
| G05D 1/00 | (2006.01) |
| H04W 84/18 | (2009.01) |

(52) U.S. Cl.
CPC ............ *H04W 8/005* (2013.01); *G08G 1/005* (2013.01); *H04L 67/12* (2013.01); *G05D 1/0088* (2013.01); *H04W 84/18* (2013.01)

(58) Field of Classification Search
CPC .................................................. H04W 8/005
See application file for complete search history.

(56) References Cited

U.S. PATENT DOCUMENTS

| | | | | |
|---|---|---|---|---|
| 9,786,178 B1 * | 10/2017 | Bai | ......................... | G08G 1/166 |
| 9,805,592 B2 * | 10/2017 | Ibrahim | .................. | G08G 1/005 |
| 9,870,703 B2 * | 1/2018 | MacNeille | ............. | G08G 1/005 |
| 10,026,313 B2 * | 7/2018 | Hayee | ..................... | G08G 1/091 |
| 10,235,882 B1 * | 3/2019 | Aoude | .................... | G08G 1/164 |
| 10,235,884 B2 * | 3/2019 | Song | ..................... | H04W 4/029 |
| 2009/0312889 A1 * | 12/2009 | Krupadanam | ......... | B60W 20/11 701/1 |
| 2013/0103779 A1 * | 4/2013 | Bai | ..................... | H04L 67/2833 709/213 |
| 2013/0210460 A1 * | 8/2013 | Subramanian | ...... | B61L 15/0027 455/456.3 |

(Continued)

FOREIGN PATENT DOCUMENTS

| | | |
|---|---|---|
| JP | 2013-537777 | 10/2013 |
| JP | 2016-540407 | 12/2016 |

OTHER PUBLICATIONS

JPO, Office Action for Japanese Patent Application No. 2018-179928, Nov. 26, 2019, 5 pages.

*Primary Examiner* — Parth Patel
(74) *Attorney, Agent, or Firm* — Burbage Law, P.C.; Jon-Michael Burbage; Elizabeth Ruzich

(57) ABSTRACT

The disclosure includes embodiments for determining to transmit an invitation to join a vehicular mesh network based on a pedestrian safety message (PSM message) according to some embodiments. A method, according to some embodiments includes receiving, by a first dedicated short range communication (DSRC) radio, a PSM message that is broadcast by a second DSRC radio that is operable to broadcast the PSM message. The method includes transmitting, by the first DSRC radio, a wireless message to the second DSRC radio which includes an invitation, wherein the wireless message is transmitted responsive to receipt of the PSM message.

20 Claims, 8 Drawing Sheets

(56) References Cited

U.S. PATENT DOCUMENTS

| | | | | |
|---|---|---|---|---|
| 2014/0045556 | A1* | 2/2014 | Subramanian | H04W 52/0251 455/574 |
| 2014/0051346 | A1* | 2/2014 | Li | H04H 20/59 455/3.01 |
| 2014/0164582 | A1* | 6/2014 | Dawson | H04W 48/18 709/221 |
| 2015/0035685 | A1* | 2/2015 | Strickland | B60Q 9/008 340/901 |
| 2015/0091740 | A1* | 4/2015 | Bai | G08B 21/06 340/901 |
| 2016/0150451 | A1* | 5/2016 | Barreto De Miranda Sargento | H04W 36/14 370/332 |
| 2016/0357187 | A1* | 12/2016 | Ansari | G01S 15/931 |
| 2016/0364678 | A1* | 12/2016 | Cao | G06Q 50/30 |
| 2016/0381538 | A1* | 12/2016 | Tan | H04W 4/90 455/404.2 |
| 2017/0150299 | A1* | 5/2017 | Coutinho | H04W 4/80 |
| 2017/0192637 | A1* | 7/2017 | Ren | G01C 21/3667 |
| 2017/0217368 | A1* | 8/2017 | Lewis | B60R 1/00 |
| 2017/0248434 | A1* | 8/2017 | Best | G01C 21/3453 |
| 2017/0274827 | A1* | 9/2017 | Lewis | B60R 1/08 |
| 2017/0292844 | A1* | 10/2017 | Spiro | G01C 21/3492 |
| 2018/0197419 | A1* | 7/2018 | Li | G01C 21/3438 |
| 2018/0262865 | A1* | 9/2018 | Lepp | H04W 4/80 |
| 2018/0316558 | A1* | 11/2018 | Levesque | H04W 76/10 |
| 2018/0328752 | A1* | 11/2018 | Tomatsu | G01C 21/3658 |
| 2018/0341261 | A1* | 11/2018 | Kislovskiy | G01C 21/3438 |
| 2018/0342154 | A1* | 11/2018 | Lee | H04W 4/40 |
| 2019/0005820 | A1* | 1/2019 | Bansal | G08G 1/166 |
| 2019/0011925 | A1* | 1/2019 | Bansal | G05D 1/0214 |
| 2019/0088041 | A1* | 3/2019 | Lee | G07C 5/008 |
| 2019/0098462 | A1* | 3/2019 | Neubecker | H04W 4/23 |

* cited by examiner

PSM DATA 195

Part 1

GPS Data for the DSRC-enabled device (local 3D)
- Latitude for the DSRC-enabled device substantially at the time when the PSM message is transmitted
- Longitude for the DSRC-enabled device substantially at the time when the PSM message is transmitted
- Elevation for the DSRC-enabled device substantially at the time when the PSM message is transmitted
- Positional accuracy for the latitude, longitude and elevation information
- Day and time when the latitude, longitude and elevation information where determined Path History Data for the DSRC-enabled device
- Historical GPS Data including all the information described above for past times

Part 2

- Path prediction for a pedestrian over a specified time frame or distance
- Group size for the pedestrian (e.g., how many pedestrians are traveling together as a group based on head count?)
- Group radius for the pedestrian (e.g., for a group of pedestrians traveling together, how big is the radius of the group as they walk together? Groups that are less densely packed together will have a bigger radius. Groups that are more densely packed together will have a smaller radius. Groups with more people by headcount will tend to have a larger radius. Groups that have less people by headcount will tend to have a smaller radius.)
- Estimate of whether the pedestrian is pushing a stroller
- Estimate of whether the pedestrian has intent to cross a roadway
- Whether the pedestrian is currently crossing a roadway
- Estimate of whether the pedestrian is traveling with an animal and the type of animal with the pedestrian
- Estimate of the non-vehicular means of propulsion of the pedestrian (e.g., bike, scooter, skateboard, etc)
- (Optional) Digital data including information which indicates one or more of the following: (1) that the candidate DSRC-enabled device is willing to join a vehicular mesh network; and (2) that the candidate DSRC-enabled device currently has its own access to the network which is independent of the vehicular mesh network.

Figure 1B

```
                                                    ┌─ 400
                                                    ▼
┌─────────────────────────────────────────────────────────────────────────┐
│ Identify that an exiting DSRC-enabled vehicle is leaving a vehicular mesh network. In │
│ some embodiments, a PSM device discovery system includes a network sniffer or some │
│ other means to detect that the exiting DSRC-enabled vehicle is leaving the vehicular │
│ mesh network. In some embodiments, the identification of the exiting DSRC-enabled │
│ vehicle leaving the vehicular mesh network triggers a "device discovery process" for the │
│ PSM device discovery system to begin to identify a new DSRC-equipped device to join │
│                  the vehicular mesh network. 401                         │
└─────────────────────────────────────────────────────────────────────────┘
                                     │
                                     ▼
┌─────────────────────────────────────────────────────────────────────────┐
│ A candidate DSRC-enabled device broadcasts a PSM message. In some        │
│ embodiments, this PSM message includes digital data in PSM data of the PSM │
│ message which indicates one or more of the following: (1) that the candidate DSRC- │
│ enabled device is willing to join the vehicular mesh network; and (2) that the candidate │
│ DSRC-equipped device currently has its own access to the Internet which is │
│ independent of the vehicular mesh network. The PSM data may also include a unique │
│              identifier of the candidate DSRC-equipped device. 403       │
└─────────────────────────────────────────────────────────────────────────┘
                                     │
                                     ▼
┌─────────────────────────────────────────────────────────────────────────┐
│ The communication unit of a DSRC-enabled ego vehicle receives the PSM message │
│ broadcast by the candidate DSRC-enabled device. The communication unit provides │
│ the PSM message to the PSM device discovery system of the DSRC-enabled ego │
│                                vehicle. 405                              │
└─────────────────────────────────────────────────────────────────────────┘
                                     │
                                     ▼
┌─────────────────────────────────────────────────────────────────────────┐
│ The PSM device discovery system of the DSRC-enabled ego vehicle analyzes the PSM │
│ data included in the PSM message and identifies, based on this analysis, the candidate │
│ DSRC-enabled device as a candidate for inclusion in the vehicular mesh network. The │
│ PSM data may include digital data that indicates that the candidate DSRC-enabled │
│ device desires to join the vehicular mesh network. The analysis provided by the PSM │
│ device discovery system may identify this digital data and determine, based on this │
│ digital data, that the candidate DSRC-enabled device is a candidate for inclusion in the │
│                      vehicular mesh network. 407                         │
└─────────────────────────────────────────────────────────────────────────┘
                                     │
                                     ▼
```

Continue to Step 408 of Figure 4B

PSM MESSAGE-BASED DEVICE DISCOVERY FOR A VEHICULAR MESH NETWORK

BACKGROUND

The specification relates to Personal Safety Messages ("PSM message" if singular, "PSM messages" if plural). In particular, this specification relates to PSM message-based device discovery for a vehicular mesh network.

Vehicle control systems are becoming increasingly popular. One example of a vehicle control system is an Advanced Driver Assistance System ("ADAS system" if singular, "ADAS systems" if plural).

ADAS systems provide one or more autonomous features to the vehicles which include these ADAS systems. For example, an ADAS system may monitor the position of a vehicle relative to the lane in which the vehicle is traveling, and if the vehicle begins to swerve outside of that lane the ADAS system may take remedial action by repositioning the vehicle so that the vehicle stays in the lane or providing a notification to a driver of the vehicle so that the driver knows that they need to take action to remedy the situation.

Some vehicles include a sufficient number and quality of autonomous features that they are considered to be autonomous vehicles.

Modern vehicles include vehicle systems (e.g., ADAS systems, autonomous driving systems, infotainment systems, etc.) which require constant and stable access to a computer network (e.g., the Internet) to provide their functionality.

SUMMARY

Constant access means that a vehicle has continuous or near continuous access to the computer network. Stable access means that the bandwidth available to the vehicle is stable and generally of sufficient quality for the systems of the vehicle which require access to the computer network to provide their functionality. Vehicles may utilize vehicular mesh networks to increase the constancy and stability of their access to a computer network.

A vehicular mesh network is a mesh network including end points which are traveling at roadway speeds (e.g., 15 miles per hour or greater) and operable to provide these endpoints with constant and stable access to a computer network (e.g., network 105 in FIG. 1A). Constant and stable access to a computer network for a vehicular mesh network is negatively affected when vehicles which were previously members of the vehicular mesh network leave the vehicular mesh network without new vehicles (or endpoints) being added at the same time (or substantially the same time) to take their place.

One way of forming a vehicular mesh network is by a plurality of vehicles exchanging Dedicated Short Range Communication ("DSRC") messages with one another in an organized manner which is operable to form a mesh network among the plurality of vehicles. The DSRC standard specifies the requirements for a vehicle to be a "DSRC-enabled vehicle." For example, a DSRC-enabled vehicle is any type of connected vehicle including a DSRC radio, a DSRC-compliant global positioning system unit (a "DSRC-compliant GPS unit") and any other hardware or software which is necessary to comply with the DSRC standard as applied to vehicles.

The DSRC standard also specifies the requirements for an electronic device which is not a vehicle to be a "DSRC-enabled device." For example, a DSRC-enabled device is any type of processor-based computing device which is not a vehicle and includes a DSRC radio, a DSRC-compliant GPS unit and any other hardware or software which is necessary to comply with the DSRC standard as applied to non-vehicular devices. In some embodiments, one or more of the following processor-based computing devices are DSRC-enabled devices if they include a DSRC radio: a smartphone (i.e., a DSRC-enabled smartphone); a tablet computer (i.e., a DSRC-enabled tablet computer); a laptop (i.e., a DSRC-enabled laptop); a smartwatch (i.e., a DSRC-enabled smartwatch); a fitness band (i.e., a DSRC-enabled fitness band); and any other processor-based computing device (i.e., a DSRC-enabled processor-based computing device).

In some embodiments, a DSRC-enabled device is carried by a pedestrian. A pedestrian includes a human that is located in a roadway environment or proximate to a roadway.

In some embodiments, a DSRC-enabled device broadcasts or unicasts one or more PSM messages. In some embodiments, a PSM message includes PSM data (see, e.g., FIG. 1B). In some embodiments, a DSRC-enabled device is referred to as a "candidate DSRC-enabled device." An example of a candidate DSRC-enabled device includes a DSRC-enabled smartphone or any other processor-based computing device which is DSRC-enabled.

In some embodiments, a PSM message is transmitted by a candidate DSRC-enabled device when the DSRC-enabled device is located in a roadway environment or proximate to a roadway (e.g., within 500 meters of a roadway, which corresponds to the transmission range of PSM messages based on the requirements of the DSRC standard).

Described herein are embodiments of a PSM device discovery system. In some embodiments, the PSM device discovery system which is installed in onboard unit (e.g., an electronic control unit or some other processor-based onboard vehicle computer) of a connected vehicle (e.g., a DSRC-enabled vehicle or some other connected vehicle). In some embodiments, the PSM device discovery system includes code and routines that are operable, when executed by the onboard unit of the connected vehicle, to cause the onboard unit to execute steps including: identifying that a connected vehicle which is a member of a vehicular mesh network is leaving (or has left) the vehicular mesh network and then identify, based on the receipt of one or more PSM messages, a candidate DSRC-enabled device to join the vehicular mesh network and thereby avoid the inconsistency and instability which is caused by a member of a vehicular mesh network leaving the vehicular mesh network without another endpoint taking its place by becoming a member of the vehicular mesh network. In some embodiments, joining a vehicular mesh network includes becoming a member of the vehicular mesh network and sharing your access to a computer network with the other members of the vehicular mesh network.

In some embodiments, a DSRC-enabled vehicle includes a set of ADAS systems. The set of ADAS systems control the motion profile of the DSRC-enabled vehicle. A set of ADAS systems may be referred to herein as an "ADAS system set." See, e.g., the ADAS system set 180 depicted in FIG. 1A.

In some embodiments, a plurality of DSRC-enabled devices broadcast a plurality of PSM messages for one or more geographic locations. For example, a plurality of pedestrians have their DSRC-enabled smartphones and these DSRC-enabled smartphones repeatedly broadcast PSM messages at a regular interval so long as the DSRC-enabled smartphones are within 500 meters of a roadway, which is the transmission range for PSM messages based on the DSRC standard. The DSRC-enabled vehicle receives the plurality of PSM messages.

In some embodiments, the DSRC-enabled vehicle is an autonomous vehicle. The National Highway Traffic Safety Administration ("NHTSA") has defined different "levels" of autonomous vehicles, e.g., Level 0, Level 1, Level 2, Level 3, Level 4 and Level 5. If a DSRC-enabled vehicle has a higher-level number than another DSRC-enabled vehicle (e.g., Level 3 is a higher-level number than Levels 2 or 1), then the DSRC-enabled vehicle with a higher-level number offers a greater combination and quantity of autonomous features relative to the DSRC-enabled vehicle with the lower level number. The different levels of autonomous vehicles are described briefly below.

Level 0: The set of ADAS systems installed in the DSRC-enabled vehicle have no vehicle control, but may issue warnings to the driver of the DSRC-enabled vehicle.

Level 1: The driver must be ready to take control of the DSRC-enabled vehicle at any time. The set of ADAS systems installed in the DSRC-enabled vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the DSRC-enabled vehicle fail to respond properly (based on the driver's subjective judgement). The set of ADAS systems installed in the DSRC-enabled vehicle executes accelerating, braking, and steering. The set of ADAS systems installed in the DSRC-enabled vehicle can deactivate immediately upon takeover by the driver.

Level 3: Within known, limited environments (such as freeways), the driver can safely turn their attention away from driving tasks, but must still be prepared to take control of the DSRC-enabled vehicle when needed.

Level 4: The set of ADAS systems installed in the DSRC-enabled vehicle can control the DSRC-enabled vehicle in all but a few environments such as severe weather. The driver must enable the automated system (which is comprised of the set of ADAS systems installed in the DSRC-enabled vehicle) only when it is safe to do so. When the automated system is enabled, driver attention is not required for the DSRC-enabled vehicle to operate safely and consistent with accepted norms.

Level 5: Other than setting the destination and starting the system, no human intervention is required. The automated system can drive to any location where it is legal to drive and make its own decision (which may vary based on the jurisdiction where the DSRC-enabled vehicle is located).

In some embodiments, the DSRC-enabled vehicle is a Highly Autonomous Vehicle ("HAV" if singular, or "HAVs" if plural). An HAV is a DSRC-enabled vehicle (e.g., the DSRC-enabled ego vehicle) that includes a set of ADAS systems that operate at Level 3 or higher as described and above, or as defined by the NHTSA on page 9 of their policy paper entitled "Federal Automated Vehicles Policy: Accelerating the Next Revolution in Roadway Safety," which was published in September of 2016.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving, by a first DSRC radio, a PSM message, where the PSM message is broadcast by a second DSRC radio that is operable to broadcast the PSM message; and transmitting, by the first DSRC radio, a wireless message to the second DSRC radio, where the wireless message includes invitation data describing an invitation and the wireless message is transmitted by the first DSRC radio responsive to receipt of the PSM message by the first DSRC radio. Other embodiments of this aspect include corresponding computer systems, apparatus, and computer programs recorded on one or more computer storage devices, each configured to perform the actions of the methods.

Implementations may include one or more of the following features. The method where the PSM message is broadcast on a band reserved for DSRC. The method where the first DSRC radio is an element of a DSRC-enabled ego vehicle. The method where second DSRC radio is an element of a candidate DSRC-enabled device. The method where the invitation invites the candidate DSRC-enabled device to join a vehicular mesh network. The method where the vehicular mesh network is operable to provide access to a computer network. The method where the candidate DSRC-enabled device has access to the computer network without joining the vehicular mesh network, further including the candidate DSRC-enabled device joining the vehicular mesh network. Implementations of the described techniques may include hardware, a method or process, or computer software on a computer-accessible medium.

One general aspect includes a system including: a processor and a first DSRC radio communicatively coupled to a non-transitory memory storing executable code which is operable, when executed by the processor, to cause the processor to: receive, by the first DSRC radio, a PSM message, where the PSM message is broadcast by a second DSRC radio that is operable to broadcast the PSM message; and transmit, by the first DSRC radio, a wireless message to the second DSRC radio, where the wireless message includes invitation data describing an invitation and the wireless message is transmitted by the first DSRC radio responsive to receipt of the PSM message by the first DSRC radio. Other embodiments of this aspect include corresponding computer systems, apparatus, and computer programs recorded on one or more computer storage devices, each configured to perform the actions of the methods.

Implementations may include one or more of the following features. The system where the processor is an element of an engine control unit. The system where the processor is an element of an onboard vehicle computer system. The system where the PSM message is broadcast on a 5.9 gigahertz band which is reserved for DSRC. The system where the first DSRC radio is an element of a DSRC-enabled ego vehicle. The system where second DSRC radio is an element of a candidate DSRC-enabled device. The system where the invitation invites the candidate DSRC-enabled device to join a vehicular mesh network. The system where the vehicular mesh network is operable to provide access to a computer network. Implementations of the described techniques may include hardware, a method or process, or computer software on a computer-accessible medium.

One general aspect includes a method including: broadcasting, by a first DSRC radio of a candidate DSRC-enabled device, a PSM message; and receiving, by the first DSRC radio, a wireless message including an invitation to join a vehicular mesh network which is operable to provide access to a computer network to one or more members of the vehicular mesh network, where the wireless message is transmitted by a second DSRC radio responsive to receiving the PSM message. Other embodiments of this aspect include corresponding computer systems, apparatus, and computer programs recorded on one or more computer storage devices, each configured to perform the actions of the methods.

Implementations may include one or more of the following features. The method where the PSM message includes pedestrian safety message data describing one or more of the following threshold criteria: (1) that the candidate DSRC-enabled device will join the vehicular mesh network if invited; and (2) that the candidate DSRC-enabled device has access to the computer network without joining the vehicular mesh network. The method where the second DSRC radio is an element of a DSRC-enabled ego vehicle and a processor of the DSRC-enabled ego vehicle determines to send the invitation to the candidate DSRC-enabled device based on the PSM message including pedestrian safety message data describing one or more of the following threshold criteria: (1) that the candidate DSRC-enabled device will join the vehicular mesh network if invited; and (2) that the candidate DSRC-enabled device has access to the computer network without joining the vehicular mesh network. The method where the candidate DSRC-enabled device is a smartphone. The method where the candidate DSRC-enabled device is a processor-based computing device. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1B is a block diagram illustrating an example of PSM data according to some embodiments.

FIGS. 4A and 4B are an example flow diagram of a method for determining to transmit an invitation to join a vehicular mesh network based on a PSM message according to some embodiments.

DETAILED DESCRIPTION

Figure 1A:
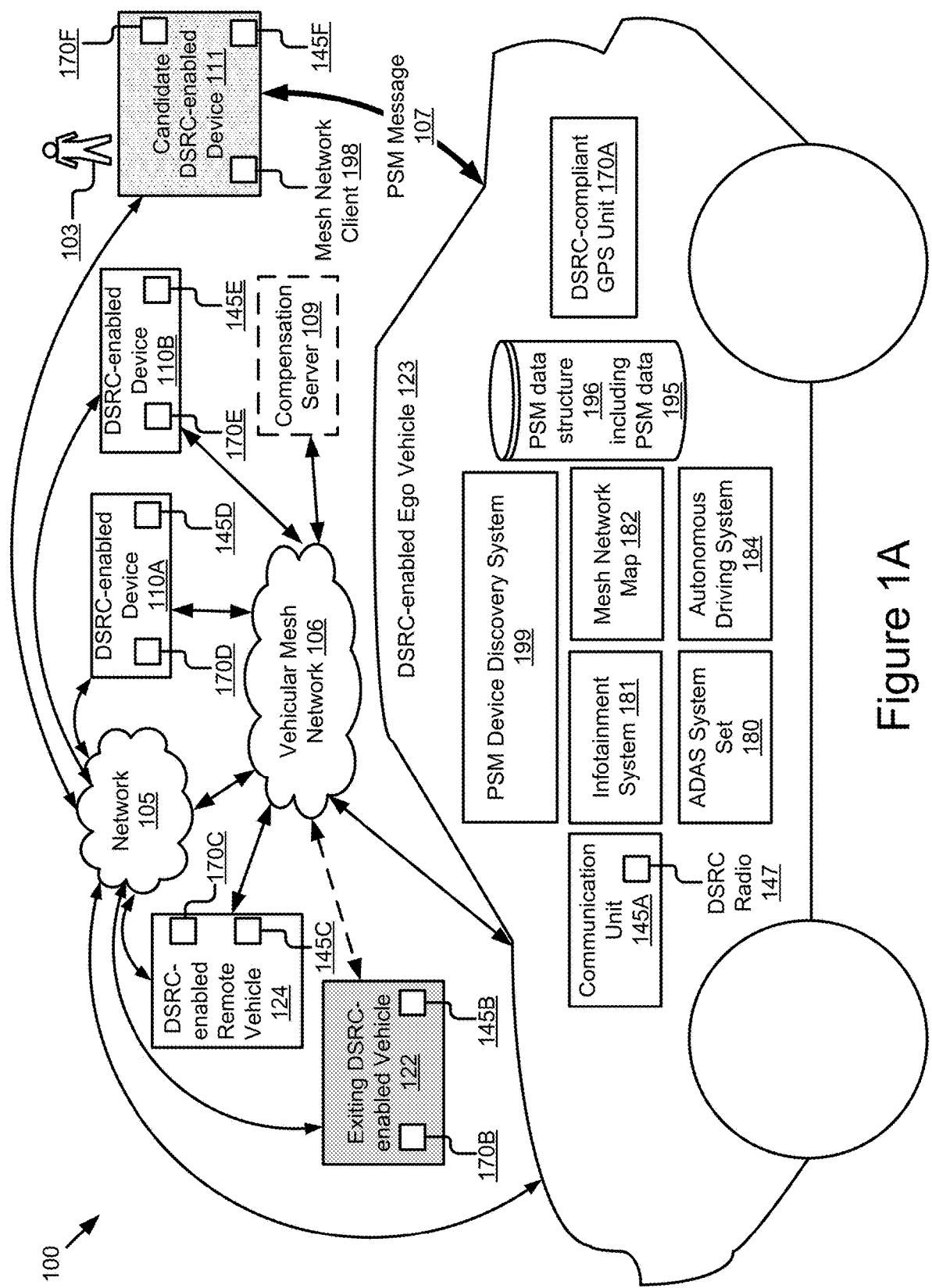
FIG. 1A is a block diagram illustrating an operating environment for a PSM device discovery system and a mesh network client according to some embodiments.

Described herein are embodiments of the PSM device discovery system and the mesh network client. The PSM device discovery system is an element of a DSRC-enabled vehicle (e.g., a DSRC-enabled ego vehicle 123 or some other DSRC-enabled vehicle such as the DSRC-enabled remote vehicle 124 as depicted in FIG. 1A). The mesh network client is an element of a DSRC-enabled device which is not a vehicle. The DSRC-enabled vehicle may be an autonomous vehicle. For example, the DSRC-enabled vehicle may be one of the following: a Level 1 autonomous vehicle; a Level 2 autonomous vehicle; a Level 3 autonomous vehicle; a Level 4 autonomous vehicle; and a Level 5 autonomous vehicle. The DSRC-enabled vehicle, such as the DSRC-enabled ego vehicle, may be an HAV.

A DSRC-enabled device (e.g., the DSRC-enabled devices 110A, 110B and the candidate DSRC-enabled device 111 as depicted in FIG. 1A) is a processor-based mobile computing device that includes a DSRC radio and a communication unit, and is operable to transmit PSM messages at regular intervals. Each PSM message includes PSM data (see, e.g., FIG. 1B).

In some embodiments, the DSRC-enabled device only transmits a PSM message if it is within 500 meters of a roadway. The DSRC-enabled device determines that it is within 500 meters of the roadway based on the geographic location of the DSRC-enabled device which is determined using a DSRC-compliant GPS unit which is also an element of the DSRC-enabled device in some embodiments.

A DSRC-enabled vehicle is a connected vehicle that includes the DSRC radio and the DSRC-compliant GPS unit. A DSRC-enabled device is not a DSRC-enabled vehicle because a DSRC-enabled device is not a vehicle. The DSRC radio and the DSRC-compliant GPS unit included in each of the DSRC-enabled vehicle and the DSRC-enabled device are similar to one another but may vary based on size since a DSRC-enabled vehicle is generally bigger than a DSRC-enabled device, and so, cost savings may be achieved by making these components of the DSRC-enabled vehicle bigger than those of the DSRC-enabled device.

In some embodiments, a DSRC radio is an electronic hardware device that includes: (1) a DSRC transmitter that is operable to transmit DSRC messages; (2) a DSRC receiver that is operable to receive DSRC messages; and (3) any other hardware or software that is necessary for the DSRC-enabled vehicle or the DSRC-enabled device to comply with the DSRC standard. It will be understood by those having ordinary skill in the art that a device which is merely able to transmit and receive cellular communications, Wi-Fi communications or millimeter wave communications is not a DSRC radio, or otherwise "DSRC-enabled," because such devices are not built for mobility and do not comply with the DSRC standard, and as such, are not able to transmit or receive DSRC messages.

In some embodiments, the DSRC-compliant GPS unit includes hardware that wirelessly communicates with a GPS satellite to retrieve positional data (herein, GPS data or DSRC-compliant GPS data) that describes a location of the DSRC-enabled vehicle or the DSRC-enabled device, as the case may be, with a precision that is compliant with the DSRC standard. The DSRC standard requires that positional data be accurate to within plus or minus 1.5 meters at least 68% of the time when the DSRC-compliant GPS unit is under an open sky. For example, the DSRC standard requires that positional information generated by the DSRC-compliant GPS unit be precise enough to infer if two vehicles (one of which is, for example, the DSRC-enabled ego vehicle 123 depicted in FIG. 1A) are in the same lane at the same time. The lane may be a lane of a roadway. The DSRC-compliant GPS unit is operable to identify, monitor and track its two-dimensional position within 1.5 meters of its actual position 68% of the time under an open sky. Since lanes of a roadway are typically no less than 3 meters wide, the positional information generated by the DSRC-compliant GPS unit describes it's position (as well as the position of the DSRC-enabled vehicle or DSRC-enabled device which includes the DSRC-compliant GPS unit) with lane-level accuracy.

By comparison, a conventional GPS unit which is not compliant with the DSRC standard is unable to determine positional information with lane-level accuracy. For example, a typical lane of a roadway is approximately 3 meters wide. However, a conventional GPS unit only has an accuracy of plus or minus 10 meters relative to the actual location of the conventional GPS unit. As a result, such conventional GPS units are not sufficiently accurate for use by the optimization client or the optimization system because doing so would generate characteristic behavior data that is erroneous in terms of the geographic locations it describes, which would eventual result in a vehicle traveling with an inappropriate motion profile relative to its current location of travel, which might cause death or injury for pedestrians which are in the vicinity of the vehicle.

In some embodiments, the DSRC standard is described in one or more of the following standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

Referring to FIG. 1A, depicted is a block diagram illustrating an operating environment 100 for a PSM device discovery system 199 and a mesh network client 198 according to some embodiments.

The operating environment 100 may include one or more of the following elements: a DSRC-enabled ego vehicle 123; an exiting DSRC-enabled vehicle 122; a DSRC-enabled remote vehicle 124; a first DSRC-enabled device 110A; a second DSRC-enabled device 110B; a candidate DSRC-enabled device 111; and (optionally, in some embodiments) a compensation server 109. These elements may be communicatively coupled to one another via a network 105 and a vehicular mesh network 106.

Although one DSRC-enabled ego vehicle 123, one exiting DSRC-enabled vehicle 122, one DSRC-enabled remote vehicle 124, two DSRC-enabled devices 110A, 110B (referred to herein collectively or individually as the DSRC-enabled device 110), one candidate DSRC-enabled device 111, one compensation server 109, one vehicular mesh network 106 and one network 105 are depicted in FIG. 1A, in practice the operating environment 100 may include one or more DSRC-enabled ego vehicles 123, one or more exiting DSRC-enabled vehicles 122, one or more DSRC-enabled remote vehicles 124, two or more DSRC-enabled devices 110, one or more candidate DSRC-enabled devices 111, one or more compensation servers 109, one or more vehicular mesh networks 106 and one or more networks 105. The operating environment 100 may also include a pedestrian 103. In some embodiments, a pedestrian 103 includes a human that is located in a roadway environment or proximate to a roadway.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. The network 105 includes a DSRC network operable to transmit or broadcast DSRC messages, including PSM messages. In some embodiments, a PSM message is a DSRC message that is broadcast (instead of unicast) and whose payload consists of PSM data 195. In other words, the payload of the PSM message includes only PSM data 195 and no other payload.

In some embodiments, the network 105 is a full-duplex network operable to send full-duplex wireless communications. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

The network 105 may include one or more communication channels shared among the DSRC-enabled ego vehicle 123, the exiting DSRC-enabled vehicle 122, the DSRC-enabled remote vehicle 124, the DSRC-enabled device 110, the candidate DSRC-enabled device 111 and the compensation server 109. The communication channel may include one or more of DSRC, LTE vehicle-to-everything (V2X), full-duplex wireless communication or any other wireless communication protocol. For example, the network 105 may be used by the candidate DSRC-enabled device 111 to broadcast a PSM message which is received by the DSRC-enabled ego vehicle 123. In another example, the network 105 is used by the DSRC-enabled ego vehicle 123 to transmit a wireless message including an invitation to join the vehicular mesh network 106 to the candidate DSRC-enabled device 111.

Modern vehicles include vehicle systems (e.g., ADAS systems, autonomous driving systems, infotainment systems, etc.) which require constant and stable access to a computer network (e.g., the network 105) to provide their functionality. Constant access means that a vehicle has continuous or near continuous access to the network 105. Stable access means that the bandwidth available to the vehicle is stable and generally of sufficient quality for the onboard systems of the vehicle (e.g., the ADAS system set 180, the autonomous driving system 184, the infotainment system 181) which, in some embodiments, require access to the network 105 to provide their functionality. An example problem which exists is that vehicles such as the DSRC-enabled vehicle 123 do not always have constant and stable access to the network 105, and as such, their onboard systems are sometimes inoperable. Vehicles such as the DSRC-enabled ego vehicle 123 may utilize a vehicular mesh network 106 to increase the constancy and stability of their access to the network 105.

A vehicular mesh network 106 is a mesh network that includes one or more of the following attributes: (1) it includes one or more end points which are traveling at roadway speeds (e.g., 15 miles per hour or greater); (2) it is operable to provide each of its endpoints (e.g., the DSRC-enabled remote vehicle 124, the DSRC-enabled ego vehicle 123, the exiting DSRC-enabled vehicle 122, the DSRC-enabled device 110, the candidate DSRC-enabled device 111, etc.) with access to the network 105; and (3) each of its endpoints is DSRC-enabled. In some embodiments, the vehicular mesh network 106 is operable to provide each of its endpoints with constant and stable access to the network 105.

One example problem with vehicular mesh networks is that the constancy and stability of the access to the network 105 provided by the vehicular mesh network 106 is negatively affected when vehicles which were previously members of the vehicular mesh network leave the vehicular mesh network (e.g., the exiting DSRC-enabled vehicle 122) without new endpoints being added at the same time (or substantially the same time) to take their place. The PSM device discovery system 199 works with the mesh network client 198 to solve this problem by executing one or more of the steps of the methods 300, 400 described below with reference to FIGS. 3, 4A and 4B.

In some embodiments, the vehicular mesh network 106 is formed exclusively using DSRC-based communications among the endpoints of the vehicular mesh network 106. An endpoint of the vehicular mesh network 106 is any processor-based computing device that is DSRC-enabled and transmits or receives DSRC messages for the purpose of forming, benefitting from or otherwise participating in the vehicular mesh network 106.

In some embodiments, the vehicular mesh network 106 includes the following endpoints: the DSRC-enabled ego vehicle 123; the exiting DSRC-enabled vehicle 122; and the DSRC-enabled remote vehicle 124. The PSM device discovery system 199 of the DSRC-enabled ego vehicle 123 includes code and routines that are operable, when executed by a processor of the DSRC-enabled ego vehicle 123, to determine one of the following: (1) the exiting DSRC-enabled vehicle 122 desires to leave the vehicular mesh network 106 (e.g., based on a wireless message transmitted by the exiting DSRC-enabled vehicle 122 and including data indicating that it is leaving the vehicular mesh network 106); and (2) the exiting DSRC-enabled vehicle 122 has already left the vehicular mesh network 106 (e.g., the exiting DSRC-enabled vehicle 122 stops transmitting DSRC messages which are necessary to be a member of the vehicular mesh network 106). This is problematic since the exiting DSRC-enabled vehicle 122 leaving the vehicular mesh network 106 without being replaced will negatively affect the constancy and stability of access to the network 105 provided by the vehicular mesh network 106 to the endpoints which are members of the vehicular mesh network 106. The PSM device discovery system 199 works with the mesh network client 198 to solve this problem. The PSM device discovery system 199 of the DSRC-enabled ego vehicle 123 includes code and routines that are operable, when executed by a processor of the DSRC-enabled ego vehicle 123, to receive a PSM message broadcast by the candidate DSRC-enabled device 111 and then, based on this PSM message (or the PSM data 195 included in the PSM message by the mesh network client 198 and containing digital information which indicates one or more of that the candidate DSRC-enabled device 111 has access to the network 105 without joining the vehicular mesh network 106 and is willing to join the vehicular mesh network 106), determine to send a wireless message to the candidate DSRC-enabled device 111 including an invitation to join the vehicular mesh network 106 so that the constancy and stability of the access to the network 105 provided by the vehicular mesh network 106 is maintained.

The DSRC-enabled ego vehicle 123 is any type of connected vehicle including a DSRC radio 147, a DSRC-compliant GPS unit 170, an ADAS system set 180 and any other hardware or software which is necessary to comply with the DSRC standard as applied to vehicles. For example, the DSRC-enabled ego vehicle 123 is one of the following types of DSRC-enabled ego vehicles 123: a car; a truck; a sports utility vehicle; a bus; a semi-truck; a drone or any other roadway-based conveyance. The DSRC-enabled ego vehicle 123 includes any hardware or software necessary to send and receive wireless messages via the network 105.

Figure 2A:
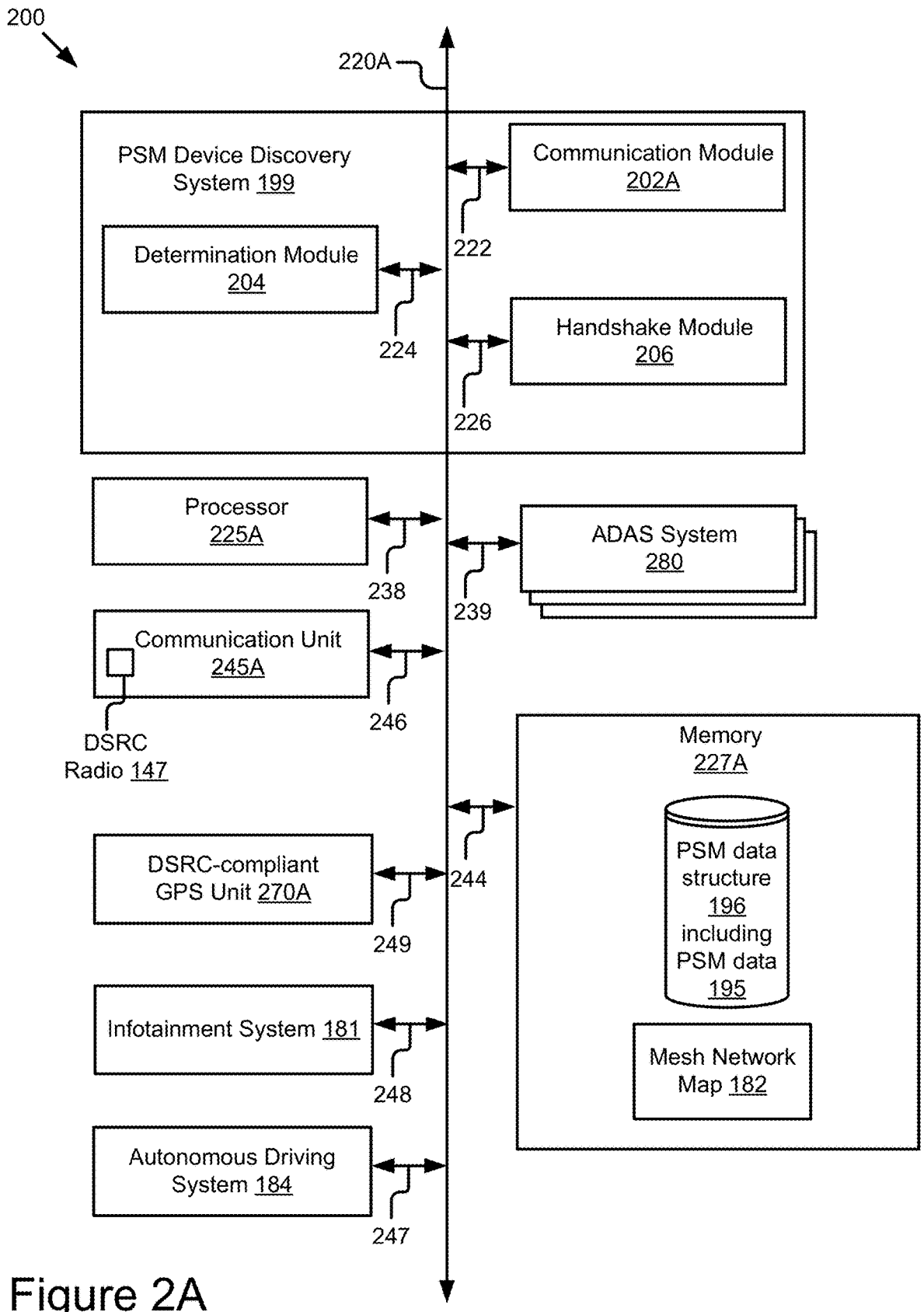
FIG. 2A is a block diagram illustrating an example computer system including the PSM device discovery system according to some embodiments.

In some embodiments, the DSRC-enabled ego vehicle 123 is an autonomous vehicle. For example, the DSRC-enabled ego vehicle 123 is one of the following: a Level 1 autonomous vehicle; a Level 2 autonomous vehicle; a Level 3 autonomous vehicle; a Level 4 autonomous vehicle; and a Level 5 autonomous vehicle. In some embodiments, the DSRC-enabled ego vehicle 123 is an HAV. An HAV is an autonomous vehicle whose ADAS system set 180 provides autonomous functionality sufficient to operate at Level 3 or greater. An example of an onboard vehicle computer for the DSRC-enabled ego vehicle 123 is depicted in FIG. 2A according to some embodiments.

The exiting DSRC-enabled vehicle 122 is a DSRC-enabled vehicle. The exiting DSRC-enabled vehicle 122 includes elements and functionality that are similar to the DSRC-enabled ego vehicle 123, and so, those descriptions will not be repeated here. For example, the exiting DSRC-enabled vehicle 122 includes one or more of the following elements which are also elements of the DSRC-enabled ego vehicle 123: the PSM device discovery system 199; the communication unit 145 including a DSRC radio; a DSRC-compliant GPS unit 170; the infotainment system 181; the mesh network map 182; the ADAS system set 180; the autonomous driving system 184; the PSM data 195; and one or more of the elements that are depicted in FIG. 2A.

One example difference between the exiting DSRC-enabled vehicle 122 and the DSRC-enabled ego vehicle 123, in some embodiments, is that the exiting DSRC-enabled vehicle 122 is leaving (or has left) the vehicular mesh network 106 whereas the DSRC-enabled ego vehicle 123 is a member of the vehicular mesh network 106 in some embodiments. The exiting DSRC-enabled vehicle 122 is depicted in FIG. 1A using a grey box in FIG. 1A to indicate that it is leaving or has left the vehicular mesh network 106. This is also why the bidirectional arrow connecting the exiting DSRC-enabled vehicle to the vehicular mesh network 106 in FIG. 1A is depicted using a dashed line. By contrast, the other endpoints which are members of the vehicular mesh network 106 are depicted in white and not grey in FIG. 1A as an indication that they are not currently exiting the vehicular mesh network 106.

The DSRC-enabled remote vehicle 124 is a DSRC-enabled vehicle that is a member of the vehicular mesh network 106. The DSRC-enabled remote vehicle 124 includes elements and functionality that are similar to the DSRC-enabled ego vehicle 123, and so, those descriptions will not be repeated here. For example, the DSRC-enabled remote vehicle 124 includes one or more of the following elements which are also elements of the DSRC-enabled ego vehicle 123: the PSM device discovery system 199; the communication unit 145 including a DSRC radio; a DSRC-compliant GPS unit 170; the infotainment system 181; the mesh network map 182; the ADAS system set 180; the autonomous driving system 184; the PSM data 195; and one or more of the elements that are depicted in FIG. 2A.

The DSRC-enabled device 110 is any type of processor-based computing device which is not a vehicle and includes a DSRC radio 147, a DSRC-compliant GPS unit 170 and any other hardware or software which is necessary to comply with the DSRC standard as applied to non-vehicular devices. For example, the DSRC-enabled device 110 is a DSRC-enabled smartphone, a DSRC-enabled laptop, a DSRC-enabled tablet computer, a DSRC-enabled fitness band or a DSRC-enabled processor-based computing device.

In some embodiments, the first DSRC-enabled device 110A and the second DSRC-enabled device 110B may be the same or different types of DSRC-enabled devices. For example, the first DSRC-enabled device 110A is a DSRC-enabled smartphone and the second DSRC-enabled device 110B is a DSRC-enabled fitness band.

The candidate DSRC-enabled device 111 is depicted in FIG. 1A using a grey box having dotted hashing in order to indicate that it is not yet a member of the vehicular mesh network 106. In some embodiments, the candidate DSRC-enabled device 111 receives an invitation to join the vehicular mesh network 106 from the DSRC-enabled ego vehicle 123 based on the PSM message 107 broadcast by the candidate DSRC-enabled device 111. The candidate DSRC-enabled device 111 is any type of processor-based computing device which is not a vehicle and includes a DSRC radio 147, a DSRC-compliant GPS unit 170 and any other hardware or software which is necessary to comply with the DSRC standard as applied to non-vehicular devices. For example, the candidate DSRC-enabled device 111 is a DSRC-enabled smartphone, a DSRC-enabled laptop, a DSRC-enabled tablet computer, a DSRC-enabled fitness band or a DSRC-enabled processor-based computing device. In some embodiments, the candidate DSRC-enabled device 111 includes a mesh network client 198.

The compensation server 109 is depicted in FIG. 1A using a dashed line to indicate that it is an optional feature of the operating environment 100. The compensation server 109 is a processor-based computing device. For example, the compensation server 109 may include one or more of the following types of processor-based computing devices: a personal computer; a laptop; a mainframe; or any other processor-based computing device that is operable to function as a server. The compensation server 109 may include a hardware server. The compensation server 109 includes any hardware or software necessary to send and receive wireless messages via the network 105.

In some embodiments, the compensation server 109 stores digital data that is linked to a bank account or some other electronic account of the pedestrian 103. In some embodiments, the pedestrian 103 is entitled to compensation for joining the vehicular mesh network 106. For example, the pedestrian 103 is entitled to a cash compensation or access to free services (e.g., access to the network 105 via the vehicular mesh network 106 at a later time when the candidate DSRC-enabled device 111 does not have access to the network 105 without connecting to the vehicular mesh network 106). One or more of the DSRC-enabled ego vehicle 123 and the candidate DSRC-enabled device 111 transmit a wireless message to the compensation server 109 reporting the amount of time that the candidate DSRC-enabled device 111 was a member of the vehicular mesh network 106 while the candidate DSRC-enabled device 111 had its own access to the network 105 without needing to use the vehicular mesh network 106 to access the network 105. The compensation server 109 includes software which is operable to calculate the compensation owned to the pedestrian based on this amount of time, and then provide the compensation to the pedestrian by either transferring money to the pedestrian's bank account or keeping a log of the amount of free services owned to the pedestrian. The candidate DSRC-enabled device 111 may include a software application (e.g., the mesh network client 198) which the pedestrian 103 can use to access the free service at a later date.

In some embodiments, the DSRC-enabled ego vehicle 123 includes one or more of the following elements: a communication unit 145; a DSRC radio 147; a DSRC-compliant GPS unit 170A; the ADAS system set 180; an infotainment system 181; an autonomous driving system 184; a mesh network map 182; a PSM data structure 196; and the PSM device discovery system 199.

In some embodiments, the exiting DSRC-enabled vehicle 122 includes: a communication unit 145B including a DSRC radio 147 (not pictured); and a DSRC-compliant GPS unit 170B.

In some embodiments, the DSRC-enabled remote vehicle 124: a communication unit 145C including a DSRC radio (not pictured); and a DSRC-compliant GPS unit 170C.

Figure 2B:
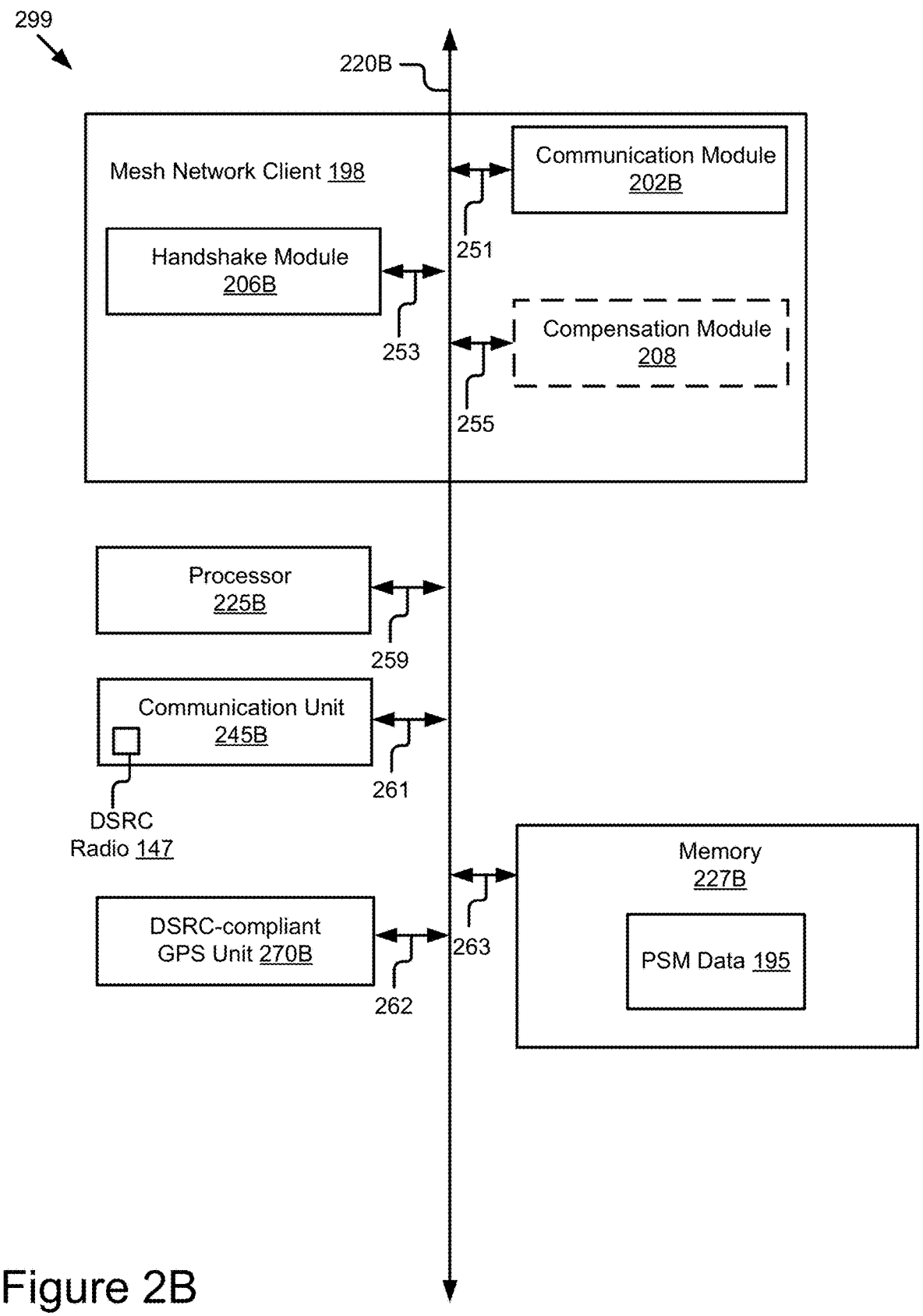
FIG. 2B is a block diagram illustrating an example computer system including the mesh network client according to some embodiments.

In some embodiments, the first DSRC-enabled device 110A includes: a communication unit 145D including a DSRC radio (not pictured); and a DSRC-compliant GPS unit 170D. Although not pictured in FIG. 1A, in some embodiments the first DSRC-enabled device 110A includes an instance of the mesh network client 198. For example, the first DSRC-enabled device 110A is a computer system 299 such as depicted in FIG. 2B.

In some embodiments, the second DSRC-enabled device 110B includes: a communication unit 145E including a DSRC radio (not pictured); and a DSRC-compliant GPS unit 170E. Although not pictured in FIG. 1A, in some embodiments the second DSRC-enabled device 110B includes an instance of the mesh network client 198. For example, the second DSRC-enabled device 110B is a computer system 299 such as depicted in FIG. 2B.

In some embodiments, the candidate DSRC-enabled device 111 includes: a communication unit 145F including a DSRC radio (not pictured); a DSRC-compliant GPS unit 170F; and the mesh network client 198.

The communication units 145A, 145B, 145C, 145D, 145E, 145F are referred to herein individually or collectively as "the communication unit 145." For example, the communication unit 145A may be referred to herein as "the communication unit 145 of the DSRC-enabled ego vehicle 123" whereas the communication unit 145B may be referred to herein as "the communication unit 145 of the exiting DSRC-enabled vehicle 122," but the communication units 145A, 145B may be referred to herein as "the communication unit 145." In some embodiments, each of the communication units includes a DSRC radio 147. Although not depicted in FIG. 1A, in some embodiments the compensation server 109 includes a communication unit 145.

The DSRC-compliant GPS units 170A, 170B, 170C, 170D, 170E, 170F are referred to herein individually or collectively as "the DSRC-compliant GPS unit 170." For example, the DSRC-compliant GPS unit 170A may be referred to herein as "the DSRC-compliant GPS unit 170 of the DSRC-enabled ego vehicle 123" whereas the DSRC-compliant GPS unit 170B may be referred to herein as "the DSRC-compliant GPS unit 170 of the exiting DSRC-enabled vehicle 122," but the DSRC-compliant GPS unit 170A, 170B may be referred to herein as "the DSRC-compliant GPS unit 170."

In some embodiments, a DSRC radio 147 is an element of a communication unit 145. In other embodiments, a DSRC radio 147 is a stand-alone element or an element of a component which is not the communication unit 145. For example, the DSRC radio 147 may be an element of the DSRC-compliant GPS unit 170.

The communication unit 145 transmits and receives data to and from one or more of the network 105, the vehicular mesh network 106 and some other communication channel. In some embodiments, the communication unit 145 may include the DSRC radio 147 and other hardware or software necessary to make the element which includes the communication unit 145 be "DSRC-enabled" and compliant with the DSRC standard.

In some embodiments, the communication unit 145 includes a port for direct physical connection to one or more of the network 105, the vehicular mesh network 106 and some other communication channel. For example, the communication unit 145 includes a universal serial bus (USB), secure digital (SD), CAT-5, or similar port for wired communication with one or more of the network 105 and the vehicular mesh network 106.

In some embodiments, the communication unit 145 includes a wireless transceiver for exchanging data with one or more of the network 105, the vehicular mesh network 106 and some other communication channel using one or more wireless communication methods, including one or more of the following: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; and another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to one or more of the network 105 and the vehicular mesh network 106 for distribution of files or media objects using standard network protocols including TCP/IP, HTTP, HTTPS, and SMTP, millimeter wave, DSRC, etc.

A DSRC radio 147 includes a DSRC antenna. The DSRC antenna includes one or more of a DSRC transceiver and a DSRC receiver. The DSRC radio 147 is operable to send and receive one or more PSM messages. In some embodiments, the DSRC radio 147 only sends PSM messages when the element which includes the DSRC radio 147 is within a predetermined proximity of a roadway. In some embodiments, the DSRC radio 147 is operable to send and receive one or more DSRC messages including, for example, Basic Safety Messages. In some embodiments, the DSRC radio 147 may include any other hardware or software necessary to make the element which includes the DSRC radio 147 be "DSRC-enabled" and compliant with the DSRC standard.

In some embodiments, the DSRC radio 147 receives GPS data from the DSRC-compliant GPS unit 170 so that the DSRC radio 147 can enforce a rule that a PSM message is only transmitted when the GPS data indicates that the DSRC radio 147 is within a threshold distance from roadway infrastructure or a roadway. For example, the threshold distance may be 500 meters (the range for transmitting DSRC messages such as the PSM message), and whether the threshold distance has been met may be determined by the DSRC radio 147 by comparing the GPS data to a roadway infrastructure map stored in a non-transitory memory that is accessible by the DSRC radio 147. The roadway infrastructure map used by the DSRC radio 147 includes digital data that describes different roadway infrastructure and the geographic locations of these different roadway infrastructure. Roadway infrastructure includes, for example: roadways; a parking lot (whether public or private); a parking garage (whether public or private); an airport; sidewalks; mediums; traffic signs; traffic lights; traffic mirrors; cross-walks; public walk-ways; public parks; rest areas; on-ramps; off-ramps; breakdown lanes; roadway median strips; hospital infrastructure related to a roadway; police infrastructure related to a roadway; firefighting infrastructure related to a roadway; and any other component of a roadway or element which is assistive to a roadway. In some embodiments, the roadway infrastructure map is described by digital data that is stored on the memory 227A depicted in FIG. 2A. In some embodiments, the DSRC radio 147 includes code and routines that are operable, when executed by a processor, to execute steps which determine whether the threshold distance is met or exceeded.

In some embodiments, the DSRC radio 147 is licensed by a government (e.g., the United States government, the Japanese government, the German government, a state or province government, etc.) to send and receive DSRC messages so that such messages may be lawfully transmitted, broadcasted and received in a jurisdiction where the DSRC radio 147 is located. For example, in some jurisdictions DSRC messages cannot be lawfully sent or received by a device unless the device which transmits the DSRC message is either licensed to do so or of a type which is permitted to do so under the laws of the jurisdiction (e.g., a first lawful type includes a DSRC-enabled ego vehicle 123 transmitting a DSRC message and a second lawful type includes a candidate DSRC-enabled device 111 transmitting a PSM message).

In some embodiments, the DSRC radio 147 is operable to broadcast a PSM message at some fixed interval (once every 0.10 seconds, which is the interval suggested by the DSRC standard) that is user configurable (provided, for example, that the DSRC radio 147 is located at a position which meets or is within the position threshold).

In some embodiments, the DSRC-compliant GPS unit 170 is operable to retrieve GPS data (not pictured) that includes digital data that describes one or more locations (or positions) of the element which includes the DSRC-compliant GPS unit 170 (e.g., the DSRC-enabled ego vehicle 123, the DSRC-enabled device 110, the compensation server 109) at one or more different times. The time value may be an element of the GPS data. The GPS data may also describe the latitude and longitude of the element which includes the DSRC-compliant GPS unit 170. The GPS data may be timestamped to indicate the time when the DSRC-enabled ego vehicle 123 was at this particular location.

In some embodiments, the DSRC-compliant GPS unit 170 includes any hardware or software necessary to make the element which includes the DSRC-compliant GPS unit 170, or the DSRC-compliant GPS unit 170 itself, compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 170 is operable to provide GPS data describing the location of the element which includes the DSRC-compliant GPS unit 170 with lane-level accuracy. For example, the exiting DSRC-enabled vehicle 122 including the DSRC-compliant GPS unit 170 includes the GPS data provided by the DSRC-compliant GPS unit 170, and the GPS data is digital data that describes the location of the exiting DSRC-enabled vehicle 122 with an accuracy of plus or minus 1.5 meters such that the GPS data can be used to accurately identify that geographical location of the exiting DSRC-enabled vehicle 122. In the context of the PSM device discovery system 199 and the mesh network client 198, lane level accuracy enables the PSM device discovery system 199 to more accurately determine or estimate when an element of the operating environment 100 that includes the DSRC-compliant GPS unit 170 is going to leave the vehicular mesh network 106. For example, the exiting DSRC-enabled vehicle 122 includes a DSRC-compliant GPS unit 170 which provides GPS data that are included in Basic Safety Messages that are broadcasted by the communication unit 145 at regular intervals (e.g., once every 0.10 seconds). The communication unit 145 of the DSRC-enabled ego vehicle 123 receives the Basic Safety Message and provides the GPS data included in the Basic Safety Message to the PSM device discovery system 199. Because the GPS data is accurate to within plus or minus 1.5 meters (as opposed to plus or minus 10 meters as is the limitation of GPS data provided by conventional GPS units), the PSM device discovery system 199 is able to analyze patterns in the GPS data received from the exiting DSRC-enabled vehicle 122 (e.g., by comparing current instances of GPS data to previous instances of GPS data included in previously broadcasted Basic Safety Messages) to identify or estimate more accurately and more quickly that the exiting DSRC-enabled vehicle 122 is about leave the vehicular mesh network 106. The PSM device discovery system 199 can then more quickly initiate the process of identifying a candidate DSRC-enabled device 111 to replace the exiting DSRC-enabled vehicle 122. By contrast, since a conventional GPS unit can only provide positional information with an accuracy of plus or minus 10 meters, such conventional GPS units may not be compatible with some embodiments of the PSM device discovery system 199 since positional information from the conventional GPS unit cannot be used to accurately identify the geographic location of the exiting DSRC-enabled vehicle 122.

In some embodiments, the DSRC-compliant GPS unit 170 includes hardware that wirelessly communicates with a GPS satellite (or a GPS server) to retrieve GPS data that describes a location of the element which includes the DSRC-compliant GPS unit 170 with a precision that is compliant with the DSRC standard. The DSRC standard requires that GPS data be precise enough to infer if two vehicles (one of which is, for example, the DSRC-enabled ego vehicle 123) are in the same lane at the same time. The lane may be a lane of a roadway. In some embodiments, the DSRC-compliant GPS unit 170 is operable to identify, monitor and track its two-dimensional position within 1.5 meters of its actual position 68% of the time under an open sky. Since lanes of a roadway are typically no less than 3 meters wide, whenever the two-dimensional error of the GPS data is less than 1.5 meters the GPS data provided by the DSRC-compliant GPS unit 170 may be analyzed to and determine what lane of the roadway the DSRC-enabled ego vehicle 123 is traveling in based on the relative positions of two or more different vehicles (one of which is, for example, the DSRC-enabled ego vehicle 123) on the roadway at the same time.

In some embodiments, the DSRC-compliant GPS unit 170 includes functionality to provide navigation assistance to the element which includes the DSRC-compliant GPS unit 170.

Although only one or more of the following elements are depicted in FIG. 1A, in practice the operating environment 100 may include one or more of the following elements: the pedestrian 103; the DSRC-enabled device 110; the compensation server 109; the network 105; the vehicular mesh network 106; the candidate DSRC-enabled device 111; the exiting DSRC-enabled vehicle 122; the DSRC-enabled remote vehicle 124; and the DSRC-enabled ego vehicle 123. For example, as described below, in practice a single DSRC-enabled ego vehicle 123 may receive PSM messages from hundreds, thousands or even millions of different candidate DSRC-enabled devices 111 and DSRC-enabled devices 110 in a given time period (e.g. one second, one minute, one hour, etc.).

Referring now to the DSRC-enabled ego vehicle 123, the ADAS system set 180 may include one or more advanced driver assistance systems ("ADAS systems"). See, for example, the one or more ADAS systems 280 depicted in FIG. 2A. Examples of ADAS systems included in the ADAS system set 180 include one or more of the following elements of the DSRC-enabled ego vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems provide their own features and functionality that may be referred to herein as a "ADAS feature" or an "ADAS functionality," respectively. The features and functionality provided by these example ADAS systems are also referred to herein as an "autonomous feature" or an "autonomous functionality," respectively. In some embodiments, the autonomous features and autonomous functionality provided by the ADAS systems of the ADAS system set 180 are sufficient to classify the DSRC-enabled ego vehicle 123 as one or more of the following: a Level 1 autonomous vehicle; a Level 2 autonomous vehicle; a Level 3 autonomous vehicle; a Level 4 autonomous vehicle; and a Level 5 autonomous vehicle. In some embodiments, the DSRC-enabled ego vehicle 123 is an HAV. An HAV is an autonomous vehicle whose ADAS system set 180 provides autonomous functionality sufficient to operate at Level 3 or greater. An example of an onboard vehicle computer for the DSRC-enabled ego vehicle 123 is depicted in FIG. 2A according to some embodiments. In some embodiments, FIG. 2A depicts an electronic control unit of the DSRC-enabled ego vehicle 123.

The infotainment system 181 is an onboard unit of the DSRC-enabled vehicle 123 which provides information or entertainment to the passengers or driver of the DSRC-enabled vehicle 123 using digital data that is received from the network 105. For example, the infotainment system 181 includes one or more of the following: an audio system which retrieves digital content (e.g., music, podcasts, talk programs or other entertainment or information) from the network 105; an audio-visual system which retrieves digital content (e.g., movies, television programs, video podcasts, etc.) from the network 105; a carputer; an in-car internet device; an automotive navigation system; and etc.

In some embodiments, the network 105 is accessed by the infotainment system 181 via the vehicular mesh network 106.

The autonomous driving system 184 is an onboard system that provides the DSRC-enabled vehicle with autonomous driving functionality. In some embodiments, the autonomous driving system 184 includes a subset of the ADAS systems included in the ADAS system set 180, and this subset provides sufficient features and functionality to make the DSRC-enabled vehicle 123 an autonomous vehicle (e.g., a Level 2 autonomous vehicle, an HAV, etc.).

The mesh network map 182 is digital data stored on a memory of the DSRC-enabled vehicle 123 (see, e.g., the memory 227A depicted in FIG. 2A) that describes each endpoint which is a member of the vehicular mesh network 106 at a particular time. For example, the mesh network map 182 describes one or more of the following endpoints as members of the vehicular mesh network 106 at a current time: the DSRC-enabled ego vehicle 123; the DSRC-enabled remote vehicle 124; the DSRC-enabled device 110; the exiting DSRC-enabled vehicle 122; and the candidate DSRC-enabled device 111. In some embodiments, the DSRC-enabled ego vehicle 123 is not a member of the vehicular mesh network 106 but has authority to invite other endpoints to join the vehicular mesh network 106.

The PSM data structure 196 is a data structure which stores digital data. For example, the PSM data structure 196 stores one or more instances of PSM data 195 which are received by the communication unit 145 of the DSRC-enabled ego vehicle 123 via the network 105. For example, the communication unit 145 of the candidate DSRC-enabled device 111 broadcasts a PSM message 107 that includes the PSM data 195 and the communication unit 145 of the DSRC-enabled ego vehicle 123 receives the PSM message 107 and stores the PSM data 195 included in the PSM message 107 in the PSM data structure 196. In some embodiments, the communication unit 145 of the DSRC-enabled ego vehicle 123 receives a plurality of PSM messages broadcasted by a plurality of different DSRC-enabled devices 110 and the candidate DSRC-enabled device 111 and the communication unit 145 of the DSRC-enabled ego vehicle 123 stores the plurality of different instances of the PSM data 195 included in the plurality of PSM messages in the PSM data structure 196.

In some embodiments, the PSM data structure 196 includes a non-transitory memory of the DSRC-enabled ego vehicle 123 or is stored in a non-transitory memory as depicted in FIG. 2A (see, e.g., the memory 227A). The PSM data 195 is described below with reference to FIG. 1B according to some embodiments.

Referring back to the FIG. 1A, in some embodiments the PSM device discovery system 199 includes code and routines that are operable, when executed by a processor of the DSRC-enabled ego vehicle 123 (see, e.g., the processor 225A depicted in FIG. 2A), to cause the processor to execute one or more steps of the method 300 described below with reference to FIG. 3 or one or more steps of the method 400 described below with reference to FIGS. 4A and 4B. The PSM device discovery system 199 is described in more detail below.

In some embodiments, the PSM device discovery system 199, when executed by the processor (or onboard unit) of the DSRC-enabled ego vehicle 123, causes the processor (or onboard unit) to execute one or more of the following steps: identify that an exiting DSRC-enabled vehicle 122 is leaving the vehicular mesh network 106; receives a PSM message 107 broadcast by the candidate DSRC-enabled device 111 (the communication unit provides the PSM message to the PSM device discovery system of the DSRC-enabled ego vehicle); analyze PSM data 195 included in a PSM message 107 broadcast by the candidate DSRC-enabled device 111 and identify, based on this analysis, the candidate DSRC-enabled device 111 as a candidate for inclusion in the vehicular mesh network 106 (e.g., the PSM data 195 includes digital data that indicates that the candidate DSRC-enabled device 111 desires to join the vehicular mesh network 106 and has its own access to the network 105 without joining the vehicular mesh network 106; transmit (e.g., unicast) a wireless message including an invitation to the candidate DSRC-enabled device 111 to join the vehicular mesh network 106; complete a handshake process with the candidate DSRC-enabled device that results in the candidate DSRC-enabled device 111 joining the vehicular mesh network 106; update the mesh network map 182 based on the inclusion of the candidate DSRC-enabled device 111 in the vehicular mesh network 106; and communicates with the compensation server 109 via the network 105 to ensure that the candidate DSRC-enabled device 111 is compensated for joining the vehicular mesh network 106.

In some embodiments, each of the DSRC-enabled devices 110 and the candidate DSRC-enabled device 111 provide PSM messages, but the PSM device discovery system 199 determines that the candidate DSRC-enabled device 111 is a candidate to join the vehicular mesh network 106 but that the DSRC-enabled devices 110 are not candidates because their PSM data 195 does not include one or more of the following: (1) an indication that they desire to join the vehicular mesh network 106; and (2) an indication that they have their own access to the network 105 without joining the vehicular mesh network 106.

In some embodiments, the PSM device discovery system 199 of the DSRC-enabled ego vehicle 123 may be implemented using hardware including a field-programmable gate array ("FPGA") or an application-specific integrated circuit ("ASIC"). In some other embodiments, the PSM device discovery system 199 is implemented using a combination of hardware and software. The PSM device discovery system 199 may be stored in a combination of the devices (e.g., servers or other devices), or in one of the devices. Additional elements of the DSRC-enabled ego vehicle 123 are depicted in FIG. 2A according to some embodiments.

In some embodiments, the mesh network client 198 includes code and routines that are operable, when executed by a processor (see, e.g., the processor 225B depicted in FIG. 2B) of the candidate DSRC-enabled device 111 (or some other non-vehicular DSRC-enabled endpoint such as the DSRC-enabled device 110), to cause the processor to execute one or more steps of the method 400 described below with reference to FIGS. 4A and 4B or one or more steps of the method 500 described below with reference to FIG. 5.

For example, in some embodiments the mesh network client 198 tracks an amount of time that the candidate DSRC-enabled vehicle 111 is a member of the vehicular mesh network 106 while still having its own access to the network 105 without joining the vehicular mesh network 106, sends a wireless message to the compensation server 109 describing this amount of time, and ensures that the candidate DSRC-enabled device 111 is compensated for this amount of time. In some embodiments, the mesh network client 198 includes code and routines which, when executed by a processor of the candidate DSRC-enabled device 111, causes the processor to display a graphical user interface on an electronic display of the candidate DSRC-enabled device 111 which is usable by the pedestrian 103 to receive compensation (e.g., to select to become a member of the vehicular mesh network 106 when the candidate DSRC-enabled device 111 does not have access to the network 105).

In some embodiments, the mesh network client 198 of the candidate DSRC-enabled vehicle 111 (or some other non-vehicular DSRC-enabled endpoint) may be implemented using hardware including FPGA or an ASIC. In some other embodiments, the mesh network client 198 is implemented using a combination of hardware and software. The mesh network client 198 is stored in a combination of the devices (e.g., servers or other devices), or in one of the devices. Additional elements of the candidate DSRC-enabled device 111 are depicted in FIG. 2B according to some embodiments.

Referring now to FIG. 1B, depicted is a block diagram illustrating an example of PSM data 195 according to some embodiments. In some embodiments, an instance of PSM data 195 describes the relationship between a particular pedestrian (or a group of pedestrians) in relation to roadway infrastructure for a particular geographic location. The roadway infrastructure may be an element of a roadway environment which includes a DSRC-enabled ego vehicle 123 which receives the PSM message 107 that includes the PSM data 195.

As depicted, the PSM data 195 includes two parts: Part 1; and Part 2.

Part 1 of the PSM data 195 includes digital data that describes: the GPS data for the DSRC-enabled device; and the path history data for the DSRC-enabled device.

The elements of the GPS data are depicted in FIG. 1B according to some embodiments. In some embodiments, the GPS data is generated by a DSRC-compliant GPS unit such that the GPS data included in Part 1 is accurate to within plus or minus 1.5 meters 68% of the time when the DSRC-compliant GPS unit of the DSRC-enabled device is under an open sky.

In some embodiments, the path history data describes historical GPS data for a successive number of past times such that the path history data describes a historical path of the DSRC-enabled device.

Part 2 of the PSM data 195 includes digital data that describes: a path prediction of the DSRC-enabled device over a specified time and frame (e.g., based on a trajectory indicated by the path history data of Part 1); a group size for the pedestrian who is carrying the DSRC-enabled device; a group radius for the pedestrian who is carrying the DSRC-enabled device; an estimate of whether the pedestrian is pushing a stroller (e.g., based on one or more of their path history, trajectory, acceleration, walking pattern and other data indicated by the digital data included in Part 1 or Part 2 versus known data for people pushing strollers); an estimate of whether the pedestrian has the intent to cross a roadway (e.g., based on the pedestrian's trajectory); an estimate of whether the pedestrian is traveling with an animal (e.g., based on one or more of their path history, trajectory, acceleration, walking pattern and other data indicated by the digital data included in Part 1 or Part 2 versus known data for pedestrians traveling with animals); an estimate of the type of animal traveling with the pedestrian if the pedestrian is estimated to be walking with an animal (e.g., based on one or more of their path history, trajectory, acceleration, walking pattern and other data indicated by the digital data included in Part 1 or Part 2 versus known data for specific animal types or pedestrians traveling with such animals); an estimate of whether the pedestrian is utilizing non-vehicular propulsion (e.g., based on one or more of their path history, trajectory, acceleration, walking pattern and other data indicated by the digital data included in Part 1 or Part 2 versus known data for pedestrians traveling on a bike, scooter, skateboard, or any other type of non-vehicle propulsion.)

In some embodiments, Part 2 of the PSM data 195 includes digital data that describes information which indicates one or more of the following: (1) that the candidate DSRC-enabled device 111 is willing to join a vehicular mesh network 106; and (2) that the candidate DSRC-enabled device 111 currently has its own access to the network 105 which is independent of the vehicular mesh network 106.

In some embodiments, having access to the network 105 which is "independent of the vehicular mesh network 106" means that the candidate DSRC-enabled device 111 has access to the network 105 when it is not a member of the vehicular mesh network 106. As a result of having access to the network 105 which is independent of the vehicular mesh network 106, the candidate DSRC-enabled device 111 provides stability and constancy of access of access to the network 105 by joining the vehicular mesh network 106. For example, the vehicular mesh network 106, as well as its members, benefit from more stable and constant access to the network 105 by the candidate DSRC-enabled device 111 joining the vehicular mesh network 106 versus the access to the network 105 provided by the vehicular mesh network 106 if another device having access to the network 105 does not join the vehicular mesh network after the exiting DSRC-enabled vehicle 122 leaves the vehicular mesh network 106. By contrast, if the candidate DSRC-enabled device 111 did not have independent access to the network 105 but joined the vehicular mesh network 106, then this would not maintain the stability and constancy of access to the network 105 for the members of the vehicular mesh network 106.

Example Computer Systems

Referring now to FIG. 2A, depicted is a block diagram illustrating an example computer system 200 including the PSM device discovery system 199 according to some embodiments.

In some embodiments, the computer system 200 may include a special-purpose computer system that is programmed to perform one or more steps of a method 300 described below with reference to FIG. 3. In some embodiments, the computer system 200 may include a special-purpose computer system that is programmed to perform one or more steps of a method 400 described below with reference to FIGS. 4A and 4B.

In some embodiments, the computer system 200 may be an onboard vehicle computer of the DSRC-enabled ego vehicle 123 (or any other DSRC-enabled vehicle depicted in FIG. 1A).

In some embodiments, the computer system 200 may include an onboard unit, electronic control unit, head unit or some other processor-based computing device of the DSRC-enabled ego vehicle 123.

The computer system 200 may include one or more of the following elements according to some examples: the PSM device discovery system 199; the processor 225A (referred to herein as the processor 225"); the memory 227A (referred to herein as the memory 227"); the communication unit 245A (referred to herein as the communication unit 245"); the DSRC-compliant GPS unit 270A (referred to herein as the "DSRC-compliant GPS unit 270"); the infotainment system 181; the autonomous driving system 184; and one or more ADAS systems 280. These components of the computer system 200 are communicatively coupled by the bus 220A (referred to herein as the "bus 220").

In the illustrated embodiment, the processor 225 is communicatively coupled to the bus 220 via a signal line 238. The memory 227 is communicatively coupled to the bus 220 via a signal line 244. The communication unit 245 is communicatively coupled to the bus 220 via a signal line 246. The DSRC-compliant GPS unit 270 is communicatively coupled to the bus 220 via a signal line 249. The infotainment system 181 is communicatively coupled to the bus 220 via a signal line 248. The autonomous driving system 184 is communicatively coupled to the bus 220 via a signal line 247. The one or more ADAS systems 280 are communicatively coupled to the bus 220 via a signal line 239.

These elements of the computer system 200 where described above with reference to FIG. 1A, and their descriptions will not be repeated here: the PSM device discovery system 199; the infotainment system 181; and the autonomous driving system 184.

The communication unit 245 provides the same functionality as the communication unit 145 described above with reference to FIG. 1A, and so, that description will not be repeated here.

The DSRC-compliant GPS unit 270 provides the same functionality as the DSRC-compliant GPS unit 170 described above with reference to FIG. 1A, and so, that description will not be repeated here.

The one or more ADAS systems 280 include the one or more ADAS systems of the ADAS system set 180. The ADAS systems which may be included in the ADAS system set 180 are described above with reference to FIG. 1A.

The processor 225 includes an arithmetic logic unit, a microprocessor, a general-purpose controller, or some other processor array to perform computations and provide electronic signals necessary to provide the functionality of the computer system 200. The processor 225 processes data signals and may include various computing architectures including a complex instruction set computer (CISC) architecture, a reduced instruction set computer (RISC) architecture, or an architecture implementing a combination of instruction sets. The computer system 200 may include one or more processors 225. Other processors, operating systems, sensors, displays, and physical configurations may be possible. In some embodiments, the one or more processors 225 are an element of an onboard vehicle computer or electronic control unit of the computer system 200.

The memory 227 is a non-transitory storage medium that stores instructions or data that may accessed and executed by the processor 225. The instructions or data may include code for performing the techniques described herein. The memory 227 may be a dynamic random-access memory (DRAM) device, a static random-access memory (SRAM) device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 227 may be reserved for use as a buffer or virtual random-access memory (virtual RAM). The computer system 200 may include one or more memories 227.

The memory 227 may store one or more of the following elements: the PSM device discovery system 199; the PSM data structure 196; the PSM data 195; the mesh network map 182; and any other digital data or information which is necessary for the PSM device discovery system 199 to provide its functionality. These elements of the memory 227 were described above with reference to FIGS. 1A and 1B, and so, there descriptions will not be repeated here: the PSM device discovery system 199; the PSM data structure 196; the PSM data 195; and the mesh network map 182.

The memory 227 may store any of the data, information or wireless messages described above with reference to FIGS. 1A and 1B or below with reference to FIGS. 2B, 3, 4A, 4B and 5. The memory 227 may store any data needed for the computer system 200 to provide its functionality.

In the illustrated embodiment shown in FIG. 2A, the PSM device discovery system 199 includes a communication module 202A (referred to herein as a "communication module 202"), a determination module 204, and a handshake module 206.

The communication module 202 can be software including routines for handling communications between the PSM device discovery system 199 and other components of the computer system 200. In some embodiments, the communication module 202 can be a set of instructions executable by the processor 225 to provide the functionality described below for handling communications between the PSM device discovery system 199 and other components of the computer system 200.

The communication module 202 sends and receives data, via the communication unit 245, to and from one or more elements of the operating environment 100 (see, e.g., FIG. 1A). For example, the communication module 202 receives or transmits, via the communication unit 245, any of the data stored in the memory 227 or messages described herein. The communication module 202 may send or receive any of the data or messages described herein via the communication unit 245.

In some embodiments, the communication module 202 receives a PSM message 107 including PSM data 195. The communication module 202 parses out the PSM data 195 from the PSM message 107 and stores the PSM data 195 in the PSM data structure.

In some embodiments, the communication module 202 receives a plurality of PSM messages from a plurality of DSRC-enabled devices such as the first DSRC-enabled device 110A, the second DSRC-enabled device 110B and the candidate DSRC-enabled device 111. At this point it is not known which of these devices is a candidate to join the vehicular mesh network 106. The communication module 202 parses out the PSM data 195 from each of the PSM messages and stores the PSM data 195 from these PSM messages in the PSM data structure 196. In some embodiments, each set of PSM data 195 from each PSM message is stored by the communication module 202 as an instance of PSM data 195 which is distinct from the other sets of PSM data 195 from the other PSM messages.

In some embodiments, the communication module 202 receives data from components of the computer system 200 and stores the data in the memory 227 (or a buffer or cache of the computer system 200). For example, the determination module 204 determines which DSRC-enabled device (e.g., the first DSRC-enabled device 110A, the second DSRC-enabled device 110B and the candidate DSRC-enabled device 111) will receive an invitation to join the vehicular mesh network 106 based on an analysis of the PSM data 195 stored in the PSM data structure 196 and the determination module 204 generates an electronic message including digital data describing an invitation to join the vehicular mesh network 106 (i.e., invitation data). In other words, the determination module 204 identifies the candidate DSRC-enabled device 111 based on analysis of the PSM data 195 and determines to transmit an invitation to join the vehicular mesh network 106 to the candidate DSRC-enabled device 111. The determination module 204 provides the invitation data to the communication module 202 via the bus 220 and the communication module 202 stores the invitation data in the memory 227 and instructs the communication unit 245 to transmit a wireless message to the candidate DSRC-enabled device 111 via the network 105.

In some embodiments, the communication module 202 may handle communications between components of the PSM device discovery system 199.

In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The determination module 204 can be software including routines for causing the communication module 202 to retrieve PSM data 195 from the PSM data structure 196, receiving the PSM data 195 from the communication module 202, analyzing the PSM data 195 to identify a candidate for joining the vehicular mesh network 106 (e.g., based on the presence of digital data in the PSM data 195 indicating one or more of the following: (1) that the candidate DSRC-enabled device 111 is willing to join a vehicular mesh network 106; and (2) that the candidate DSRC-enabled device 111 currently has its own access to the network 105 which is independent of the vehicular mesh network 106); generating a wireless message for the candidate (e.g., the candidate DSRC-enabled vehicle 111) including an invitation to join the vehicular mesh network 106; and causing the communication module 202 or the communication unit 245 to transmit the wireless message including the invitation to the candidate via the network 105.

In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

The handshake module 206 can be software including routines for completes a handshake process with the candidate DSRC-enabled device 111 that results in the candidate DSRC-enabled device 111 joining the vehicular mesh network 106, tracking how long the candidate DSRC-enabled device is a member of the vehicular mesh network 106 and wirelessly communicates with the compensation server 109 via the network 105 to ensure that the candidate DSRC-enabled device 111 is compensated for joining the vehicular mesh network 106.

In some embodiments, the handshake module 206 can be stored in the memory 227 of the computer system 200 and can be accessible and executable by the processor 225. The handshake module 206 may be adapted for cooperation and communication with the processor 225 and other components of the computer system 200 via signal line 226.

Referring now to FIG. 2B, depicted is a block diagram illustrating an example computer system 299 including the mesh network client 198 according to some embodiments.

In some embodiments, the computer system 299 may include a special-purpose computer system that is programmed to perform one or more steps of a method 400 described below with reference to FIGS. 4A and 4B. In some embodiments, the computer system 299 may include a special-purpose computer system that is programmed to perform one or more steps of a method 500 described below with reference to FIG. 5.

In some embodiments, the computer system 299 may be an element of one or more of the first DSRC-enabled device 110A, the second DSRC-enabled device 110B and the candidate DSRC-enabled device 111 described herein with reference to one or more of FIGS. 1A, 1B, 2A, 3, 4A, 4B and 5.

The computer system 299 may include one or more of the following elements according to some examples: the mesh network client 198; the processor 225B (referred to herein as the processor 225"); the memory 227B (referred to herein as the memory 227"); the communication unit 245B (referred to herein as the communication unit 245"); and the DSRC-compliant GPS unit 270B (referred to herein as the DSRC-compliant GPS unit 270). These components of the computer system 299 are communicatively coupled by the bus 220B (referred to herein as the "bus 220").

In the illustrated embodiment, the processor 225 is communicatively coupled to the bus 220 via a signal line 259. The memory 227 is communicatively coupled to the bus 220 via a signal line 263. The communication unit 245 is communicatively coupled to the bus 220 via a signal line 261. The DSRC-compliant GPS unit 270 is communicatively coupled to the bus 220 via a signal line 262.

The mesh network client 198 was described above with reference to FIGS. 1A, 1B and 2A, and their descriptions will not be repeated here. The processor 225, the memory 227, the communication unit 245 and the DSRC-compliant GPS unit 270 depicted in FIG. 2B are similar to those described above for FIG. 2A, and so, there descriptions will not be repeated here.

The memory 227 may store the PSM data 195 and, optionally, invitation data received via a wireless message including an invitation to join the vehicular mesh network 106.

The memory 227 may store any of the data, information or wireless messages described above with reference to FIGS. 1A, 1B and 2A or below with reference to FIGS. 3, 4A, 4B and 5. The memory 227 may store any data needed for the computer system 299 to provide its functionality.

In the illustrated embodiment shown in FIG. 2B, the mesh network client 198 includes a communication module 202B (referred to herein as a "communication module 202"), a handshake module 206B (referred to herein as a "handshake module 206"), and a compensation module 208.

The communication module 202 can be software including routines for handling communications between the mesh network client 198 and other components of the computer system 299. In some embodiments, the communication module 202 can be a set of instructions executable by the processor 225 to provide the functionality described below for handling communications between the mesh network client 198 and other components of the computer system 299. In some embodiments, the communication module 202 can be stored in the memory 227 of the computer system 299 and can be accessible and executable by the processor 225. The communication module 202 may be adapted for cooperation and communication with the processor 225 and other components of the computer system 299 via signal line 251.

The communication module 202 sends and receives data, via the communication unit 245, to and from one or more elements of the operating environment 100 (see, e.g., FIG. 1A). For example, the communication module 202 receives or transmits, via the communication unit 245, any of the data stored in the memory 227 or messages described herein (e.g., PSM messages including the PSM data 195). In some embodiments, the communication module 202 sends or receives any of the data or messages described herein via the communication unit 245.

In some embodiments, the communication module 202 receives data from components of the computer system 299 and stores the data in the memory 227 (or a buffer or cache of the computer system 299). For example, the communication module 202 receives any of the data described above with reference to the memory 227 from the communication unit 245 (via the network 105 or the vehicular mesh network 106) and stores this data in the memory 227 (or a buffer or cache of the computer system 299).

In some embodiments, the communication module 202 may handle communications between components of the mesh network client 198.

In some embodiments, the communication module 202 may broadcast the PSM message including the PSM data 195. This PSM message is then received by the DSRC-enabled ego vehicle 123 and the PSM data 195 included in the PSM message is analyzed by the PSM device discovery system 199 as described herein.

The handshake module 206 can be software including routines for receiving an invitation to join the vehicular mesh network 106, determining to join the vehicular mesh network 106 and completing a handshake process with the PSM device discovery system 199 of the DSRC-enabled ego vehicle 123 (via the network 105) which results in the computer system 299 joining the vehicular mesh network 106 (e.g., the candidate DSRC-enabled device 111 joining the vehicular mesh network 106). In some embodiments, the handshake module 206 determines to join the vehicular mesh network 106 if an invitation to join the vehicular mesh network 106 is received.

In some embodiments, the handshake module 206 is stored the memory 227 of the computer system 299 and is accessible and executable by the processor 225. The handshake module 206 may be adapted for cooperation and communication with the processor 225 and other components of the computer system 299 via signal line 253.

The compensation module 208 can be software including routines for tracking how long the computer system 299 is a member of the vehicular mesh network 106 and wirelessly communicating with the compensation server 109 via the network 105 to ensure that the computer system 299 is compensated for joining the vehicular mesh network 106.

In some embodiments, the compensation module 208 is stored in the memory 227 of the computer system 299 and is accessible and executable by the processor 225. The compensation module 208 may be adapted for cooperation and communication with the processor 225 and other components of the computer system 299 via signal line 255.

Example Methods

Figure 3:
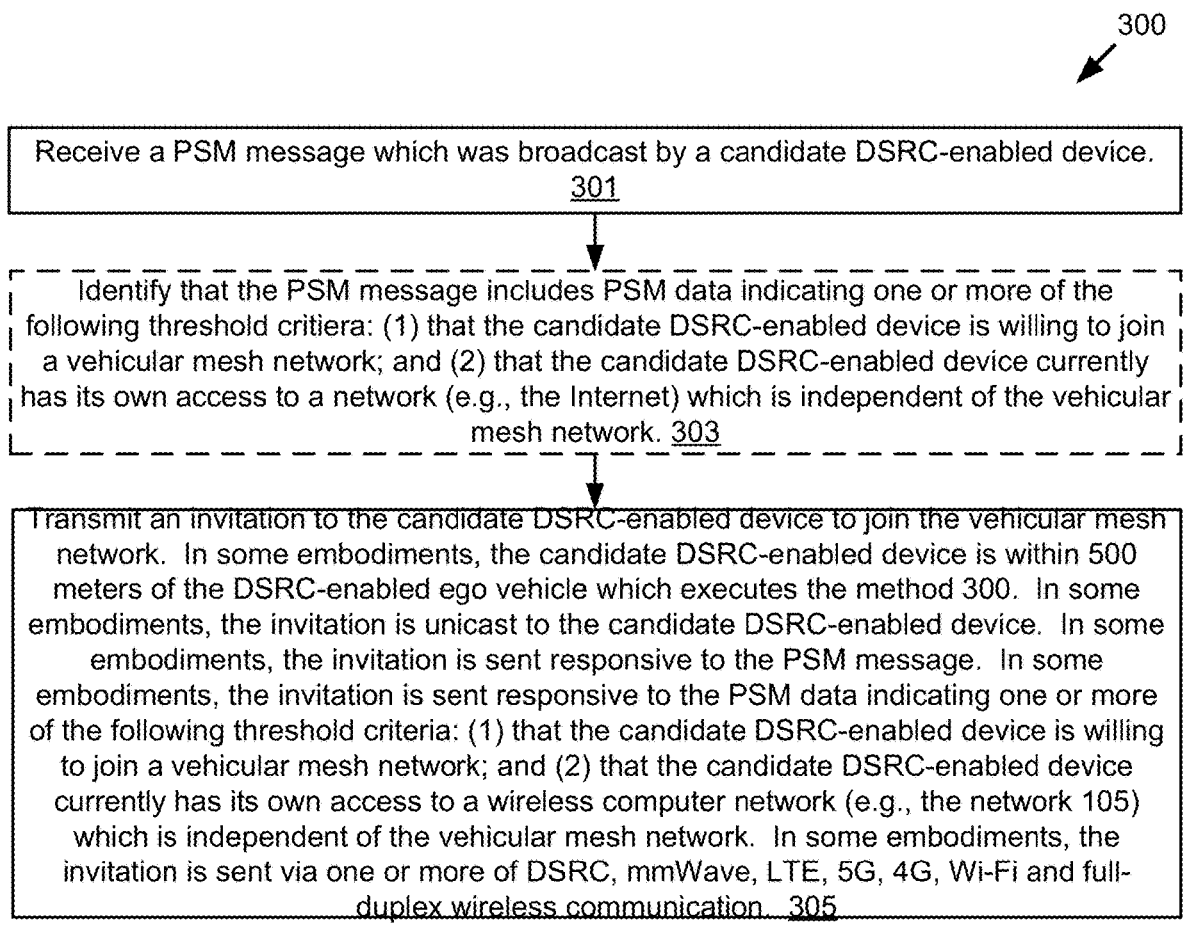
FIG. 3 is an example flow diagram of a method for determining to transmit an invitation to join a vehicular mesh network based on a PSM message according to some embodiments.

Referring now to FIG. 3, depicted is an example flow diagram of a method 300 for determining to transmit an invitation to join a vehicular mesh network based on a PSM message according to some embodiments. One or more of the steps described herein for the method 300 may be executed by the computer system 200 described above with reference to FIG. 2A. For example, the PSM device discovery system 199 includes code and routines that are operable, when executed by the processor 225, to cause the processor 225 to execute one or more steps of the method 300.

At step 301, a PSM message is received. The PSM message is broadcast by candidate DSRC-enabled device or some other DSRC-enabled device (e.g., a smartphone of a pedestrian). One or more PSM messages may be broadcast. The PSM messages may be broadcast periodically. The PSM messages include PSM data such as described above with reference to FIG. 1B. The PSM message is received by a DSRC radio of a DSRC-enabled ego vehicle.

At step 303, the PSM message received by the DSRC radio is analyzed to identify that the PSM message includes PSM data indicating one or more of the following threshold criteria: (1) that the candidate DSRC-enabled device is willing to join a vehicular mesh network; and (2) that the candidate DSRC-enabled device currently has its own access to a network (e.g., the network 105) which is independent of a vehicular mesh network.

In some embodiments, identifying that a PSM message includes PSM data indicating the one or more threshold criteria indicates that the DSRC-enabled device which broadcast the PSM message is a candidate to join the vehicular mesh network (i.e., the DSRC-enabled device which broadcast this PSM message is the candidate DSRC-enabled device). In other words, in some embodiments the identifying step 303 identifies a candidate DSRC-enabled device based on the digital data included in the PSM data of each PSM message received by the DSRC radio.

In some embodiments, the PSM data of each PSM message is analyzed at step 303 to determine if the device which broadcast the PSM message is the candidate DSRC-enabled device. This analysis may stop upon identifying at least one candidate DSRC-enabled device since expediency of completing the method 300 promotes a more constant and stable access to the network (e.g., the network 105) for the endpoints which are members of the vehicular mesh network.

At step 305, a wireless message including an invitation to join the vehicular mesh network is generated and transmitted to the candidate DSRC-enabled device. This wireless message may be referred to herein as "the invitation" because it includes invitation data inviting a particular endpoint to join the vehicular mesh network.

In some embodiments, the candidate DSRC-enabled device is within 500 meters of a DSRC-enabled ego vehicle which executes the method 300. In some embodiments, the invitation is unicast to the candidate DSRC-enabled device.

In some embodiments, the invitation is sent responsive to the PSM message being received at step 301. In some embodiments, the invitation is sent responsive to the PSM data indicating one or more of the following threshold criteria: (1) that the candidate DSRC-enabled device is willing to join a vehicular mesh network; and (2) that the candidate DSRC-enabled device currently has its own access to a wireless computer network (e.g., the network 105) which is independent of the vehicular mesh network.

In some embodiments, the invitation is sent via one or more of DSRC, mmWave, LTE, 5G, 4G, Wi-Fi and full-duplex wireless communication.

At step 307, the optimization client causes the communication unit of the DSRC-enabled vehicle to transmit a wireless message, via a network, to a server that includes an optimization system and an aggregated PSM data structure. The aggregated PSM data structure PSM data received from one or more different vehicles for one or more different pedestrians. This step may be repeated periodically.

In some embodiments, the method 300 is executed by the PSM device discovery system which is an element of the DSRC-enabled ego vehicle. In some embodiments, the DSRC-enabled ego vehicle is an autonomous vehicle operating at one or more of Level 1, Level 2, Level 3, Level 4 and Level 5. In some embodiments, the DSRC-enabled ego vehicle is an HAV.

Figure 4B:
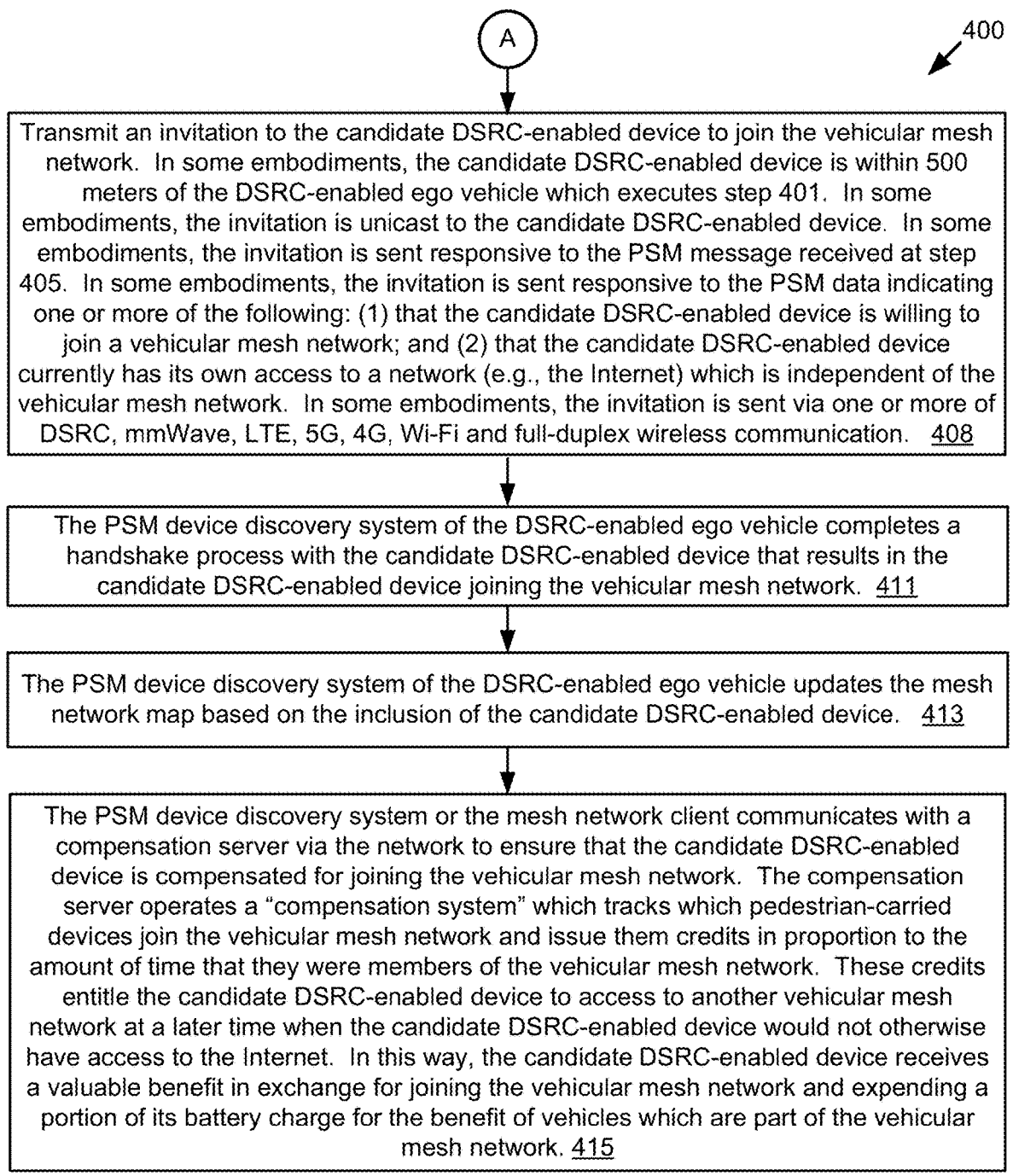

Referring to FIGS. 4A and 4B, depicted is an example flow diagram of a method 400 for determining to transmit an invitation to join a vehicular mesh network based on a PSM message according to some embodiments.

Referring to FIG. 4A, at step 401, an identification is made that an exiting DSRC-enabled vehicle is leaving a vehicular mesh network.

In some embodiments, a PSM device discovery system includes a network sniffer or some other means to detect that the exiting DSRC-enabled vehicle is leaving the vehicular mesh network.

In some embodiments, Basic Safety Messages (which are transmitted at regular intervals, e.g., once every 0.10 seconds) from members of the vehicular mesh network are analyzes, including the GPS data included therein, to identify based on the GPS data across sequentially received Basic Safety Messages that a vehicle is leaving the vehicular mesh network, and as such, is an exiting DSRC-enabled vehicle.

In some embodiments, the exiting DSRC-enabled vehicle transmits a wireless message which describes that it is leaving the vehicular mesh network, and this wireless message (e.g., an exit message) is received and read to identify that the exiting DSRC-enabled vehicle is leaving the vehicular mesh network.

In some embodiments, the identification of the exiting DSRC-enabled vehicle leaving the vehicular mesh network triggers a "device discovery process" (e.g., steps 403-411 or method 300) for the PSM device discovery system to begin to identify a new DSRC-enabled device (e.g., the candidate DSRC-enabled device 111) to join the vehicular mesh network.

In some embodiments, step 401 is executed by a PSM device discovery system included in a DSRC-enabled ego vehicle.

At step 403, a candidate DSRC-enabled device broadcasts a PSM message. In some embodiments, this PSM message includes digital data in PSM data of the PSM message which indicates one or more of the following: (1) that the candidate DSRC-enabled device is willing to join the vehicular mesh network; and (2) that the candidate DSRC-enabled device currently has its own access to the Internet which is independent of the vehicular mesh network. The PSM data may also include a unique identifier of the candidate DSRC-enabled device. This unique identifier may be used to distinguish PSM messages received from one DSRC-enabled device from those received from another DSRC-enabled device.

At step 405, the communication unit of a DSRC-enabled ego vehicle receives the PSM message broadcast by the candidate DSRC-enabled device. In some embodiments, the PSM message is received by the DSRC radio included in the communication unit. In some embodiments, the communication unit provides the PSM message to the PSM device discovery system of the DSRC-enabled ego vehicle.

At step 407, the PSM device discovery system of the DSRC-enabled ego vehicle analyzes the PSM data included in the PSM message and identifies, based on this analysis, the candidate DSRC-enabled device as a candidate for inclusion in the vehicular mesh network. The PSM data may include digital data that indicates that the candidate DSRC-enabled device desires to join the vehicular mesh network. The analysis provided by the PSM device discovery system may identify this digital data and determine, based on this digital data, that the candidate DSRC-enabled device is a candidate for inclusion in the vehicular mesh network. For example, the PSM data includes digital data that meets the threshold criteria described above with reference to FIG. 3.

Referring now to FIG. 4B, at step 408, a wireless message including an invitation to join the vehicular mesh network is generated and transmitted to the candidate DSRC-enabled device. This wireless message may be referred to herein as "the invitation" because it includes invitation data inviting a particular endpoint to join the vehicular mesh network.

In some embodiments, the candidate DSRC-enabled device is within 500 meters of an ego vehicle which executes step 401. In some embodiments, the invitation is unicast to the candidate DSRC-enabled device.

In some embodiments, the invitation is sent responsive to the PSM message being received at step 405. In some embodiments, the invitation is sent responsive to the PSM data indicating one or more of the following threshold criteria: (1) that the candidate DSRC-enabled device is willing to join a vehicular mesh network; and (2) that the candidate DSRC-enabled device currently has its own access to a wireless computer network (e.g., the network 105) which is independent of the vehicular mesh network.

In some embodiments, the invitation is sent via one or more of DSRC, mmWave, LTE, 5G, 4G, Wi-Fi and full-duplex wireless communication.

At step 411, the PSM device discovery system of the DSRC-enabled ego vehicle completes a handshake process with the candidate DSRC-enabled device that results in the candidate DSRC-enabled device joining the vehicular mesh network. In some embodiments, joining a vehicular mesh network includes becoming a member of the vehicular mesh network and the candidate DSRC-enabled device sharing its access to a computer network (e.g., the network 105 of FIG. 1A) with the other members of the vehicular mesh network.

At step 413, the PSM device discovery system of the DSRC-enabled ego vehicle updates the mesh network map based on the inclusion of the candidate DSRC-enabled device.

At step 415, the PSM device discovery system or the mesh network client communicates with a compensation server via the network to ensure that the candidate DSRC-enabled device is compensated for joining the vehicular mesh network (and sharing its access to the network 105). The compensation server operates a "compensation system" which tracks which pedestrian-carried devices join the vehicular mesh network and issue them credits in proportion to the amount of time that they were members of the vehicular mesh network. These credits entitle the candidate DSRC-enabled device to access to another vehicular mesh network at a later time when the candidate DSRC-enabled device would not otherwise have access to the Internet. In this way, the candidate DSRC-enabled device receives a valuable benefit in exchange for joining the vehicular mesh network and expending a portion of its battery charge for the benefit of vehicles which are part of the vehicular mesh network.

Figure 5:
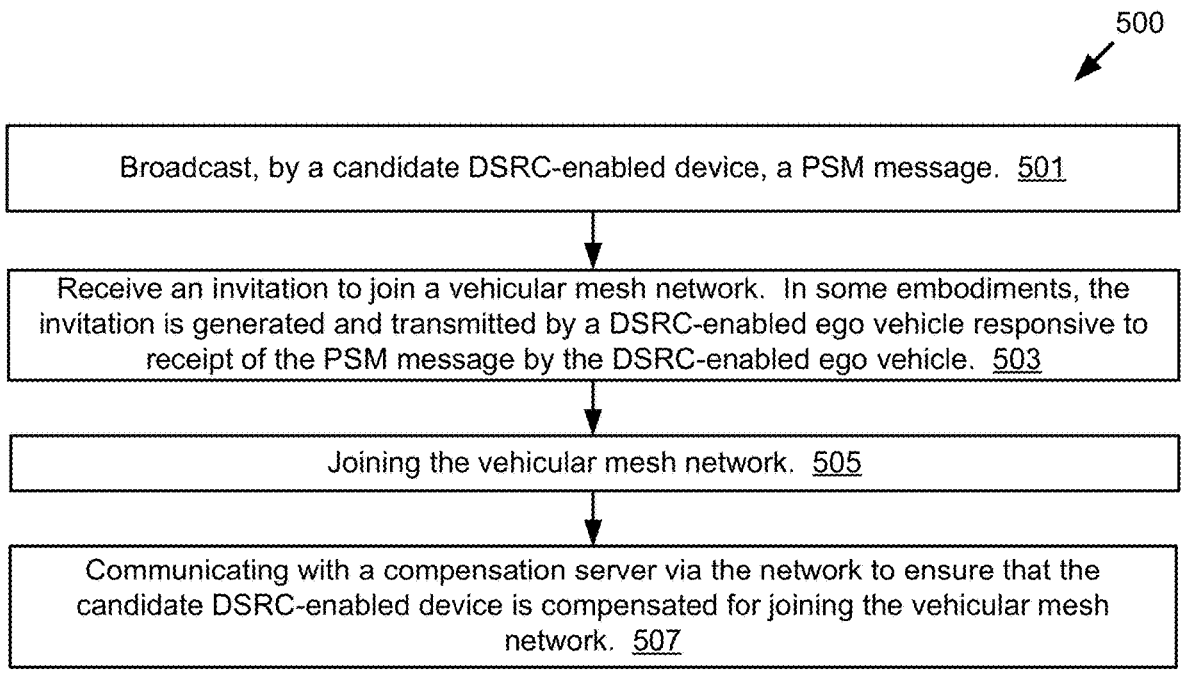
FIG. 5 is an example flow diagram of a method for receiving an invitation to join a vehicular mesh network based on broadcast of a PSM message according to some embodiments.

Referring now to FIG. 5, depicted is an example flow diagram of a method 500 for receiving an invitation to join a vehicular mesh network based on broadcast of a PSM message according to some embodiments. In some embodiments, one or more steps of the method 500 are executed by the computer system 299 depicted in FIG. 2B. For example, the mesh network client 198 includes code and routines that are operable, when executed by the processor 225, to execute one or more steps of the method 500.

At step 501, a PSM message is broadcast by a candidate DSRC-enabled device.

At step 503, an invitation to join a vehicular mesh network is received by a communication unit of the candidate DSRC-enabled device. In some embodiments, the invitation is generated and transmitted by a DSRC-enabled ego vehicle responsive to receipt of the PSM message by the DSRC-enabled ego vehicle.

At step 505, the candidate DSRC-enabled vehicle joins the vehicular mesh network (e.g., via a handshake process or any other process for joining a mesh network). In some embodiments, joining the vehicular mesh network includes becoming a member of the vehicular mesh network and sharing the candidate DSRC-enabled vehicle's access to a computer network (e.g., the network 105 of FIG. 1A) with the other members of the vehicular mesh network.

At step 507, the candidate DSRC-enabled device communicates with a compensation server via a network (e.g., the network 105) to ensure that the candidate DSRC-enabled device is compensated for joining the vehicular mesh network. Step 507 is an optional step of the method 500.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
identifying that a first dedicated short range communication (DSRC)-enabled vehicle is leaving a vehicular mesh network;
receiving, by a first DSRC radio of a second DSRC-enabled ego vehicle, a pedestrian safety message (a PSM message), wherein the PSM message is broadcast by a second DSRC radio that is operable to broadcast the PSM message and the PSM message includes digital data that indicates that the second DSRC radio is part of a candidate DSRC-enabled device that is willing to join a vehicular mesh network;
responsive to identifying that the first DSRC-enabled vehicle is leaving the vehicular mesh network, analyzing the digital data from the PSM message to identify the candidate DSRC-enabled device; and
transmitting, by the first DSRC radio, a wireless message to the second DSRC radio, wherein the wireless message includes invitation data describing an invitation to join the vehicular mesh network and the wireless message is transmitted by the first DSRC radio responsive to receipt of the PSM message by the first DSRC radio.

2. The method of claim 1, wherein the PSM message is broadcast on a band reserved for DSRC.

3. The method of claim 1, wherein the PSM message further indicates that the candidate DSRC-enabled device currently has its own access to internet independent of the vehicular mesh network.

4. The method of claim 1, further comprising:
responsive to the candidate DSRC-enabled device joining the vehicular mesh network, updating a mesh network map based on inclusion of the candidate DSRC-enabled device.

5. The method of claim 4, wherein the digital data of the PSM message indicates that the second DSRC radio currently has its own access to the vehicular mesh network and analyzing the digital data is further based on the second DSRC radio having its own access to the vehicular mesh network.

6. The method of claim 5, wherein the vehicular mesh network is operable to provide access to a computer network.

7. The method of claim 6, wherein the candidate DSRC-enabled device has access to the computer network without joining the vehicular mesh network, further comprising the candidate DSRC-enabled device joining the vehicular mesh network.

8. A system comprising:
a processor and a first dedicated short range communication (DSRC) radio communicatively coupled to a non-transitory memory storing executable code which is operable, when executed by the processor, to cause the processor to:
identify that a first DSRC-enabled vehicle is leaving a vehicular mesh network;
receive, by the first DSRC radio of a second DSRC-enabled ego vehicle, a pedestrian safety message (a PSM message), wherein the PSM message is broadcast by a second DSRC radio that is operable to broadcast the PSM message and the PSM message includes digital data that indicates that the second DSRC radio is part of a candidate DSRC-enabled device that is willing to join the vehicular mesh network;

responsive to identifying that the first DSRC-enabled vehicle is leaving the vehicular mesh network, analyzing the digital data from the PSM message to identify the candidate DSRC-enabled device; and transmit, by the first DSRC radio, a wireless message to the second DSRC radio, wherein the wireless message includes invitation data describing an invitation to join the vehicular mesh network and the wireless message is transmitted by the first DSRC radio responsive to receipt of the PSM message by the first DSRC radio.

9. The system of claim 8, wherein the processor is an element of an engine control unit.

10. The system of claim 8, wherein the processor is an element of an onboard vehicle computer system.

11. The system of claim 8, wherein the PSM message is broadcast on a 5.9 gigahertz band which is reserved for DSRC.

12. The system of claim 8, wherein the PSM message further indicates that the candidate DSRC-enabled device currently has its own access to internet independent of the vehicular mesh network.

13. The system of claim 8, wherein executable code is further operable to cause the processor to:

responsive to the candidate DSRC-enabled device joining the vehicular mesh network, update a mesh network map based on inclusion of the candidate DSRC-enabled device.

14. The system of claim 13, wherein the digital data of the PSM message indicates that the second DSRC radio currently has its own access to the vehicular mesh network and analyzing the digital data is further based on the second DSRC radio having its own access to the vehicular mesh network.

15. The system of claim 14, wherein the vehicular mesh network is operable to provide access to a computer network.

16. A method comprising:

broadcasting, by a first dedicated short range communication (DSRC) radio of a candidate DSRC-enabled device, a pedestrian safety message (a PSM message), wherein the PSM message includes pedestrian safety message data that indicates that the candidate DSRC-enabled device is willing to join a vehicular mesh network; and receiving, by the first DSRC radio, a wireless message including an invitation to join the vehicular mesh network which is operable to provide access to a computer network to one or more members of the vehicular mesh network, wherein the wireless message is transmitted by a second DSRC radio responsive to receiving the PSM message and responsive to a first DSRC-enabled vehicle leaving the vehicular mesh network.

17. The method of claim 16, wherein the pedestrian safety message data further describes that the candidate DSRC-enabled device has access to the computer network without joining the vehicular mesh network.

18. The method of claim 16, wherein the second DSRC radio is an element of a DSRC-enabled ego vehicle and a processor of the DSRC-enabled ego vehicle determines to send the invitation to the candidate DSRC-enabled device based on the PSM message including pedestrian safety message data describing one or more of the following threshold criteria: (1) that the candidate DSRC-enabled device will join the vehicular mesh network if invited; and (2) that the candidate DSRC-enabled device has access to the computer network without joining the vehicular mesh network.

19. The method of claim 16, wherein the candidate DSRC-enabled device is a smartphone.

20. The method of claim 16, wherein the candidate DSRC-enabled device is a processor-based computing device.

* * * * *